United States Patent [19]
Takada et al.

[11] Patent Number: 5,634,740
[45] Date of Patent: *Jun. 3, 1997

[54] LARGE-DEPTH UNDERGROUND DRAINAGE FACILITY AND METHOD OF RUNNING SAME

[75] Inventors: Kunio Takada, Ibaraki-ken; Kenji Otani; Masayuki Yamada, both of Tsuchiura; Saburo Maru, Ibaraki-ken; Sumio Sudo, Ibaraki-ken; Sadashi Tanaka, Ibaraki-ken, all of Japan

[73] Assignee: Hitachi, Ltd., Tokyo, Japan

[*] Notice: The term of this patent shall not extend beyond the expiration date of Pat. No. 5,487,621.

[21] Appl. No.: 552,840

[22] Filed: Nov. 3, 1995

Related U.S. Application Data

[63] Continuation of Ser. No. 192,289, Feb. 4, 1994, Pat. No. 5,487,621, which is a continuation-in-part of Ser. No. 988,755, Dec. 10, 1992, Pat. No. 5,360,290, and Ser. No. 900,418, Jun. 18, 1992, Pat. No. 5,360,289.

[30] Foreign Application Priority Data

Feb. 5, 1993 [JP] Japan .................. 5-018783

[51] Int. Cl.$^6$ ................................. E02B 11/00
[52] U.S. Cl. ................................. 405/52; 405/36
[58] Field of Search ................... 405/52, 36, 37, 405/43, 45, 40; 137/236.1; 210/170

[56] References Cited

U.S. PATENT DOCUMENTS

| | | | |
|---|---|---|---|
| 4,457,646 | 7/1984 | Laesch | 405/36 X |
| 4,527,927 | 7/1985 | Bucherre | 405/36 X |
| 4,997,312 | 3/1991 | Regan | 405/37 |
| 5,160,216 | 11/1992 | Takada et al. | |
| 5,228,802 | 7/1993 | Kuwabara et al. | |
| 5,249,887 | 10/1993 | Phillips | 405/53 X |

FOREIGN PATENT DOCUMENTS

| | | |
|---|---|---|
| 4203035 | 7/1992 | Japan . |
| 4363427 | 12/1992 | Japan . |

OTHER PUBLICATIONS

Ebara Jiho No. 109, pp. 13–16.

*Primary Examiner*—Dennis L. Taylor
*Attorney, Agent, or Firm*—Antonelli, Terry, Stout & Kraus, LLP

[57] ABSTRACT

An underground water channel is provided in an underground of a large depth, and rain water and the like flow into this underground channel from flood control channels, conduits and rivers through vertical shafts. A pump well of a pump station is connected to a downstream end of the underground channel, and water flowing into the pump well is discharged by a pump to a discharge tank. The pump is disposed generally at a medium water level of the underground channel, and a lowest water level L.W.L enabling draining is the medium water level of the underground channel. In an open channel flow operation of an open channel-closed channel mixed flow operation, water level of the underground channel is maintained at the lowest water level L.W.L, so that the underground channel is in an open channel condition. In the closed channel flow operation, the underground channel is fully filled with water, and further water level rises into the vertical shafts, so that the underground channel is in a closed channel condition. By changing an outflow factor in accordance with rainfall patterns, the rate of flow into the vertical shafts can be accurately estimated, so that the large-depth underground drainage facility can be run in a stable manner.

6 Claims, 20 Drawing Sheets

FIG. I

F I G. 16
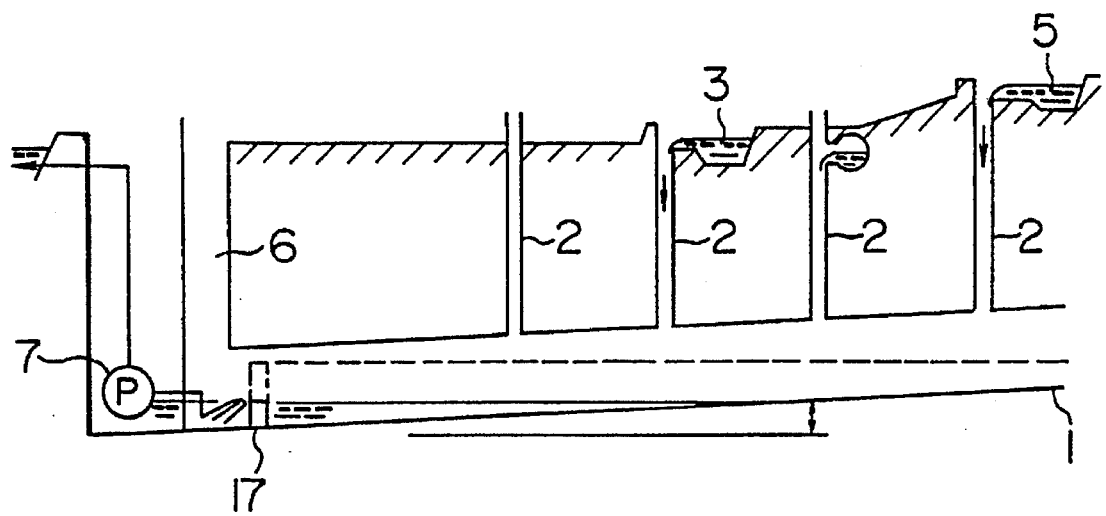
F I G. 17
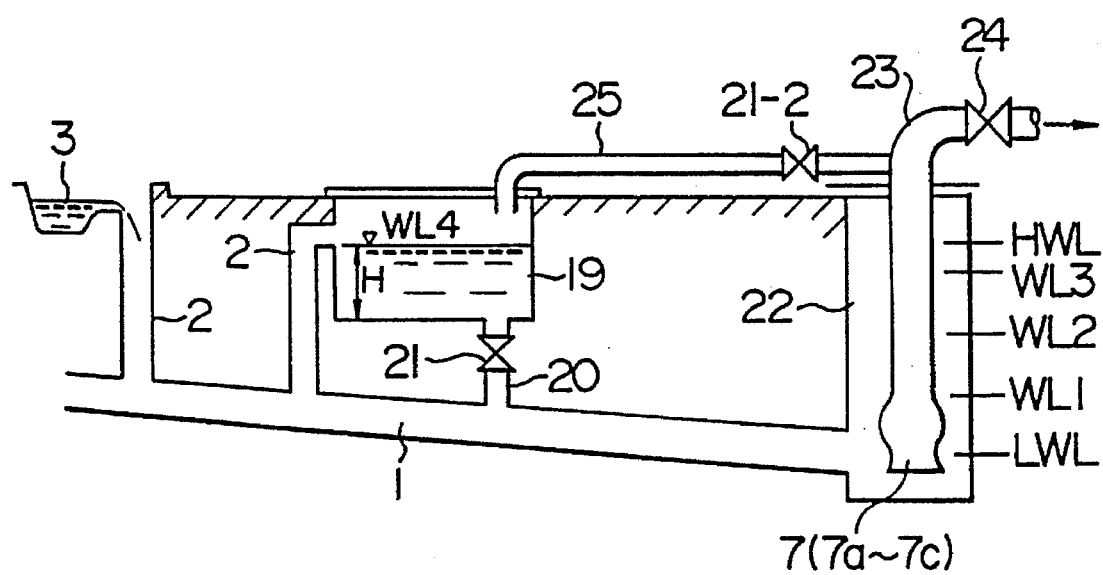

LARGE-DEPTH UNDERGROUND DRAINAGE FACILITY AND METHOD OF RUNNING SAME

CROSS REFERENCE TO RELATED APPLICATION

This application is a Continuation of application Ser. No. 08/192,289, filed Feb. 4, 1994, now U.S. Pat. No. 5,487,621, which was a continuation in part of patent application Ser. No. 07/988,755, filed on Dec. 10, 1992, now U.S. Pat. No. 5,360,290, and patent application Ser. No. 07/900,418, filed on Jun. 18, 1992, now U.S. Pat. No. 5,360,289.

BACKGROUND OF THE INVENTION

This invention relates to a large-depth underground drainage facility which is arranged such that influent flow, such as rainwater and the like flowing into water channels including small rivers, is collected in an inflow channel provided underground, and the collected influent flow is led to a pump station and then is discharged therefrom to a river or the like. More specifically, the invention relates to such a large-depth underground drainage facility which can be built at less costs, and also to a method of running such an underground drainage facility.

There is known an open channel flow operation in which drain water from flood control channels, provided in and near to the ground surface, flows through vertical shafts, and then is led to a pump station through an underground water channel, provided in an underground of a large depth, in such a manner that a space is maintained in the underground channel above a water level of this underground channel (that is, the underground channel is not fully filled with the drain water). There is also known a closed channel flow operation in which the drain water flows through the underground channel in such a manner that the drain water fully fills the underground channel.

In the open channel flow operation, in order to minimize the risk that the water overflows from the vertical shafts to the ground surface when the drain water flows abruptly into the underground channel, the underground channel has a large capacity, that is, a diameter, for example, of 12.5 m, so that the water level in the underground channel can be kept low.

The level of an impeller of a pump provided at a downstream end of the underground channel needs to be below the level of draining of the underground channel so that the underground channel can always be made empty. Generally, the lowest water level L.W.L is disposed near to the bottom of the underground channel. The pump is provided at the square pump station, and the pump is started and stopped in accordance with predetermined levels of the water in a pump well.

On the other hand, in the closed channel flow operation, the pump is operated when at least the underground channel is filled with the water and further the water level rises into the vertical shafts. This condition is encountered when the amount of influent flow exceeds the draining ability of the pump.

For estimating the rate of flow into the pump station, the amount of rainfall is estimated in accordance with rainfall information, and the amount of flow into each vertical shaft is estimated in accordance with an outflow factor representative of the ratio of this rainfall amount to the amount of rainwater flowing into rivers. The amounts of flow into all the vertical shafts are totaled to determine the estimated rate of flow into the pump station.

Since the pump of the pump station for carrying out the conventional open channel flow operation is disposed at the level near to the bottom of the underground channel, the head (lift) Ha between the water level of a discharge water tank and the lowest water level L.W.L is large, and therefore the total head of the pump is large, and the installation cost of the pump station including pumps and a drive machine is high. And besides, since the water level of the underground channel is kept low, a storage effect is low, and the water level drops soon to stop the pump, and then the water level is recovered in a short time, so that the pump is again started, which often results in hunting.

Since the underground channel having a length of several kilometers has a large diameter, the cost of excavating the underground channel, which accounts for a larger proportion of the installation cost of the large-depth underground drainage facility, is high. Since the pump is to be installed in an underground of a large depth, the excavation cost of the pump station is also high.

On the other hand, in the closed channel flow operation, the water level of the underground channel is higher as compared with the open channel flow operation, and therefore the total head of the pump is small, and the installation cost of the pump station including the pumps and the drive machine is lower; however, there is encountered a higher possibility that the water overflows from the vertical shafts to the ground surface.

With respect to the conventional outflow factor for estimating the inflow amount, no consideration has been given to the fact that when the interval between rainfalls is short, the rainwater hardly penetrates into the ground, but flows into the drainage facility to increase the inflow amount. Thus, the accuracy of the estimated amount of flow into the vertical shafts is low with respect to a change in the interval between rainfalls. This may result in a possibility that the pump station is not properly operated, so that the water may overflow from the vertical shafts.

SUMMARY OF THE INVENTION

It is an object of this invention to provide a large-depth underground drainage facility which can be built at low costs.

Another object of the invention is to provide a method of running a large-depth underground drainage facility in a stable manner.

According to a first aspect of the present invention, there is provided a large-depth underground drainage facility comprising an underground water channel of a large capacity which is provided in an underground of a large depth and is slanting gently; vertical shafts for leading drain water downwardly into the underground channel from flood control channels provided in and near to a ground surface; a pump well provided at a downstream end of the underground channel; and a pump station having a pump by which the water which has flowed into the pump well is pumped to rivers or the sea; wherein an impeller of the pump in the pump station is disposed generally at a medium water level of the underground channel; and the pump has such pump characteristics that the pump can pump the water from a closed channel water level at a rated flow rate, and also can pump the water from an open channel water level at a minimum flow rate.

According to a second aspect of the invention, there is provided a large-depth underground drainage facility comprising an underground water channel of a large capacity which is provided in an underground of a large depth, and is slanting gently; vertical shafts for leading drain water downwardly into the underground channel from flood control channels provided in and near to a ground surface; a pump well provided at a downstream end of the underground channel; and a pump station having a pump by which the water flowed into the pump well is pumped to rivers or the sea; wherein an impeller of the pump in the pump station is disposed generally at a medium water level of the underground channel; the pump can pump the water from a closed channel water level at a rated flow rate, and also can pump the water from an open channel water level at a minimum flow rate, and can achieve a maximum efficiency at a flow rate between the closed channel operation and the open channel operation.

According to a third aspect of the invention, there is provided a large-depth underground drainage facility comprising an underground water channel of a large capacity which is provided in an underground of a large depth, and is slanting gently; vertical shafts for leading drain water downwardly into the underground channel from flood control channels provided in and near to a ground surface; a pump well provided at a downstream end of the underground channel; and a pump station having a pump by which the water which has flowed into the pump well is pumped to rivers or the sea; wherein an impeller of the pump in the pump station is disposed generally at a medium water level of the underground channel; and the pump is of such a variable pitch type that the pump can pump the water from a closed channel water level at a rated flow rate, and also can pump the water from an open channel water level at a minimum flow rate.

According to a fourth aspect of the invention, there is provided a large-depth underground drainage facility comprising an underground water channel of a large capacity which is provided in an underground of a large depth, and is slanting gently; vertical shafts for leading drain water downwardly into the underground channel from flood control channels provided in and near to a ground surface; a pump well provided at a downstream end of the underground channel; and a pump station having a pump by which the water which has flowed into the pump well is pumped to rivers or the sea; wherein an impeller of the pump in the pump station is disposed generally at a medium water level of the underground channel; and the pump is of a two-stage impeller type which comprises a first impeller capable of providing a total head at which the water can be pumped from a closed channel water level at a rated flow rate, and a second impeller capable of providing a total head at which the water can be pumped from an open channel water level at a minimum flow rate.

According to a fifth aspect of the invention, there is provided a method of running a large-depth underground drainage facility comprising the steps of causing drain water from flood control channels, provided in and near to a ground surface, to flow downwardly through vertical shafts, and further causing the drain water to flow downwardly from the vertical shafts into an underground water channel of a large capacity which is provided in an underground of a large-depth and which is slanting gently; and pumping the drain water, flowed into a pump well provided at a downstream end of the underground channel, to rivers or the sea by a pump provided in a pump station; wherein the above method comprises the step of carrying out a closed channel-open channel mixed flow operation in which the pump is operated at a flow rate greater than the rate of flow of the drain water flowing into the pump station in a closed channel condition in which the underground channel is fully filled with the drain water, and the pump is operated at a flow rate less than the rate of flow of the drain water flowing into the pump station in an open channel condition in which a water level in the underground channel is lower.

According to a sixth aspect of the invention, there is provided a large-depth underground drainage facility comprising an underground water channel of a large capacity which is provided in an underground of a large depth and is slanting gently; vertical shafts for leading drain water downwardly into the underground channel from flood control channels provided in and near to a ground surface; a pump well provided at a downstream end of the underground channel; and a pump station having a pump by which the water which has flowed into the pump well is pumped to rivers or the sea; wherein the pump is disposed in an underground at a level at least higher than an upper end of the underground channel; and a pumping tank of a large capacity is provided between the pump well and the pump, with the bottom of the pumping tank disposed generally at the same level as that of the pump.

According to a seventh aspect of the invention, there is provided a method of selecting a large-depth underground drainage facility, which comprises an underground water channel of a large capacity which is provided in an underground of a large depth, and is slanting gently; vertical shafts for leading drain water downwardly into the underground channel from flood control channels provided in and near to a ground surface; a pump well provided at a downstream end of the underground channel; and a pump station having a pump by which the water which has flowed into the pump well is pumped to rivers or the sea, in such a manner that a construction cost of the large-depth underground drainage facility can be a minimum; wherein when it is difficult to obtain a construction lot for the pump station, there is selected the type of large-depth underground drainage facility in which the pump is disposed generally at a medium water level of the underground channel; and when it is easy to obtain the construction lot, there is selected the type of large-depth underground drainage facility in which the pump is disposed at a level at least higher than an upper end of the underground channel, and a pumping tank of a large capacity is provided between the pump well and the pump.

According to an eighth aspect of the invention, there is provided a method of running a large-depth underground drainage facility comprising the steps of:

calculating an amount of rainfall in accordance with rainfall information;

calculating the rate of flow into vertical shafts in accordance with the rainfall amount and an outflow factor defined by the interval between the rainfall pattern and a subsequent rainfall pattern;

calculating the rate of flow into a pump station in accordance with the rate of flow into the vertical shafts; and determining the number of pumps to be operated, as well as the ability thereof, in accordance with the rate of flow into the pump station, so as to drain water from the pump station.

The pump of the pump station is disposed generally at the medium water level of the underground channel, and the open channel flow operation is carried out. The rated flow rate of the pump is obtained at the total head at the high water level in the closed channel flow operation in which the underground channel is fully filled with the water. With this arrangement, the total head is smaller than that in the conventional construction in which the water is pumped from a low water level of an underground channel at a rated flow rate in an open channel flow operation. Therefore, the installation costs of pumps and drive machines are reduced, and the energy consumed for the pumping operation is reduced. Since the pump is disposed at the medium water level of the underground channel, a space is available in the underground channel above this medium level, and the storage effect of the long underground channel reduces the risk of increase of the water level. Therefore, the diameter of the underground channel can be reduced, and the cost of excavating the underground channel can be reduced.

The characteristics of the pump are such that the pump has the total head at which the pumping from the closed channel water level is possible at the rated flow rate, and also has the total head at which the pumping from the open channel water level is possible at the minimum flow rate. With this arrangement, the closed channel flow operation, in which the water needs to be pumped at the low total head at the rated flow rate, and the open channel flow operation, in which the water needs to be pumped at the high total head at the minimum flow rate, can be carried out by the same pump. This suppresses the increase of the number of the pumps to be installed.

The pump efficiency is determined to be maximum at the flow rate between the flow rate in the closed channel condition and the flow rate in the open channel condition. With this arrangement, the cost of the pumps and drive machine for the open channel-closed channel mixed flow operation can be reduced.

The pump is capable of varying the pitch of vanes, so that the pump has the total head at which the pump can pump the water from the closed channel water level at the rated flow rate, and also has the total head at which the pump can pump the water from the open channel water level at the minimum flow rate. With this arrangement, the same pump can be used in both of the closed channel condition and the open channel condition, and therefore the increase of the number of the pumps can be suppressed.

The pump is of a two-stage impeller type which comprises an impeller accommodating the total head at which the water can be pumped from the closed channel water level at the rated flow rate and the total head at which the water can be pumped from the open channel water level at the minimum flow rate. With this arrangement, the same pump can be used in both of the closed channel condition and the open channel condition, and therefore the increase of the number of the pumps can be suppressed.

There is provided the closed channel-open channel mixed flow operation system in which the pump is operated at the rated flow rate in the closed channel condition of the underground channel, and also the pump is operated at the minimum flow rate in the open channel condition of the underground channel. With this method, regardless of the condition of the underground channel, the large-depth underground drainage facility can be run in a stable manner.

The pumping tank of a large capacity is provided between the pump well and the pump of the large-depth underground drainage facility for effecting the closed channel flow operation. Thanks to the storage effect of this pumping tank, the risk of overflow from the underground channel to the ground surface is reduced, and the diameter of the underground channel can be reduced. Moreover, because of the storage effect of the pumping tank, the large-depth underground drainage facility can be run in a stable manner in the closed channel flow operation.

When it is difficult to obtain a construction lot for the pump station, the open channel-closed channel mixed flow operation system not requiring the pumping tank of a large capacity is selected, and when it is easy to obtain a construction lot for the pumping tank of a large capacity, the closed channel flow operation system requiring a small pump head is selected. By doing so, the large-depth underground drainage facility requiring a minimum construction cost can be selected.

Generally, with respect to a rainfall pattern, the amount of rainfall increases with time, and reaches a peak, and then decreases to zero. The degree of penetration of the rain water into the ground varies depending on a time interval between a rainfall and a subsequent rainfall. For example, if this time interval is short, the rain water hardly penetrates into the ground, but flows into the vertical shafts in an increased amount. In accordance with the outflow factor determined by the time interval between the rainfall patterns, the amount of rainfall is calculated so as to find the rate of flow into the vertical shafts, thereby accurately estimating the rate of flow into the pump station. With this method, the operation of the pump station is properly controlled, and the large-depth underground drainage facility can be run in a stable manner.

Other objects and features of the present invention will become manifest upon making reference to the detailed description of the accompanying drawings.

BRIEF DESCRIPTION OF THE DRAWINGS

FIG. 16 is a vertical cross-sectional view showing an embodiment of the invention in which a movable weir is provided in an underground discharge channel disposed upstream of a pump station;

FIG. 17 is a vertical cross-sectional view showing a modification of the embodiment of FIG. 12;

DESCRIPTION OF THE PREFERRED EMBODIMENTS

A preferred embodiment of the present invention will now be described with reference to the drawings.

First, a basic construction of a large-depth underground drainage facility will be described.

Figure 1:
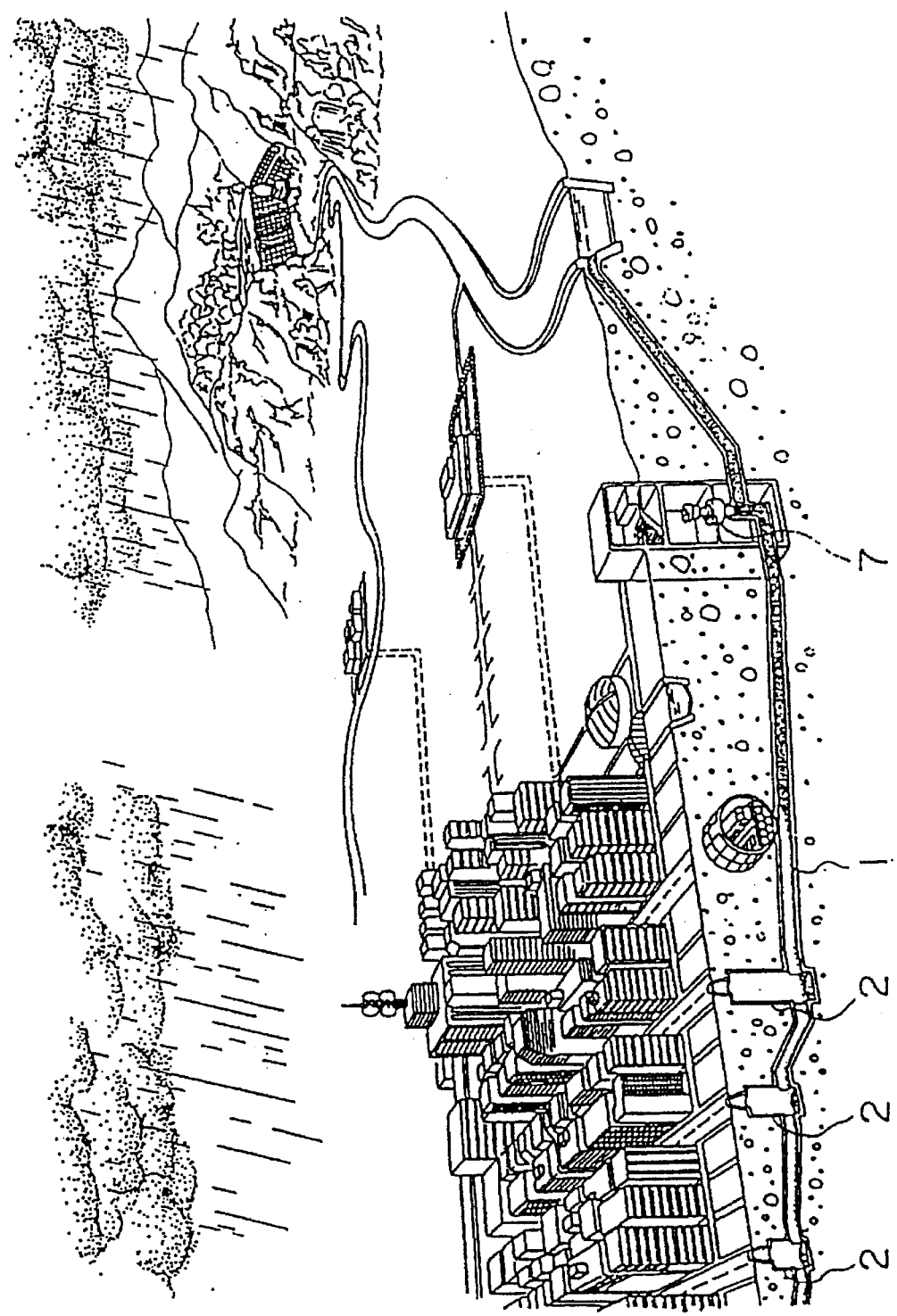
FIG. 1 is a perspective view showing a basic construction of a large-depth underground drainage facility of the present invention.

FIG. 1 is a perspective view showing an overall construction of the large-depth underground drainage facility of the present invention.

In the large-depth underground drainage facility, an underground water channel 1 slanting gently is provided in an underground of a large depth as shown in FIG. 1, and rainwater and the like flow from flood control channels and conduits into the underground channel 1 through vertical shafts 2. A downstream end of the underground channel 1 communicates with a pump station, and the water flowed into the pump station is discharged by a pump or pumps 7 to rivers.

The construction of characteristic portions of a large-depth underground drainage facility of the invention for carrying out an open channel-closed channel mixed flow operation will now be described.

Figure 2:
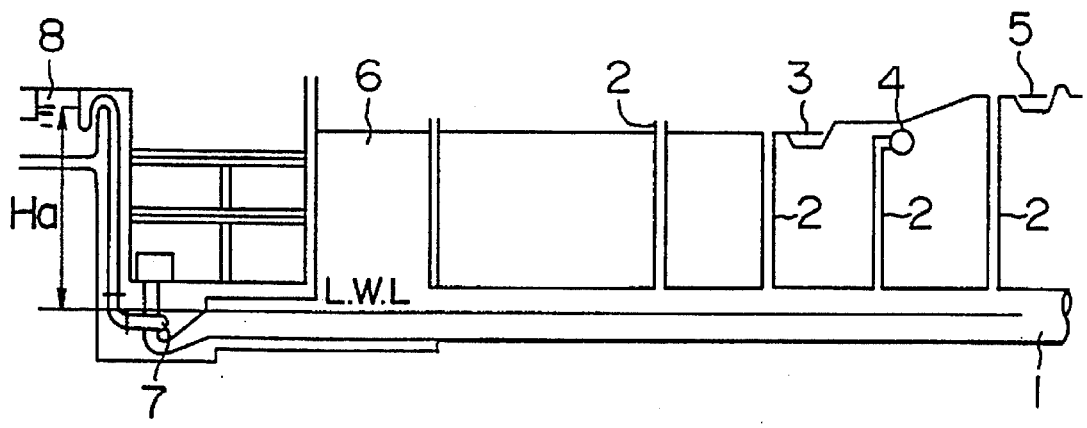
FIG. 2 is a view explanatory of an embodiment of the invention for carrying out an open channel-closed channel mixed flow operation.

FIG. 2 is a view explanatory of the construction of the large-depth underground drainage facility of the invention for carrying out the open channel-closed channel mixed flow operation.

As shown in FIG. 2, an underground water channel 1 having a large bore diameter of not less than 10 m is provided in an underground of a large depth (for example, at a depth of at least 50 m from the ground surface such that building structures on the ground surface are not affected by the provision of the underground channel 1). Rainwater and the like flow into the underground channel 1 from a flood control channel 3, a conduit 4, rivers 5 and so on through vertical shafts 2. A downstream end of the underground channel 1 communicates with a pump well 6 of a pump station, and the water flowed into the pump well 6 is discharged by a pump 7 to a discharge water tank 8.

In the conventional open channel flow operation, the level at which a pump is mounted is generally at the level of the bottom of the underground channel 1; however, in the open channel flow operation of this embodiment, the pump 7 is mounted generally at a medium water level of the underground channel 1, and therefore the lowest water level L.W.L enabling the draining is the medium water level of the underground channel 1. In the open channel flow operation of the open channel-closed channel mixed flow operation, the water level of the underground channel 1 is maintained at the lowest water level L.W.L, so that the underground channel 1 serves as an open water channel having a space above the water level of the underground channel 1. On the other hand, in the closed channel flow operation, the underground channel 1 is filled with the water to serve as a closed water channel, thereby allowing the water to rise up to a level higher than a lowermost portion of the vertical shaft 2.

The total head H of the pump in the open channel-closed channel mixed flow operation will now be described.

Figure 3A:
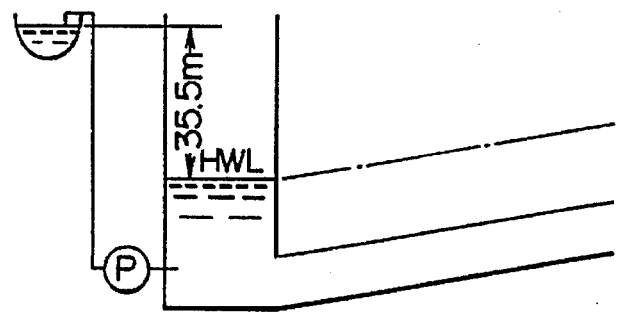
FIGS. 3A and 3B are views explanatory of the water level at which a pump is started in the open channel-closed channel mixed flow operation of the invention.
Figure 3B:
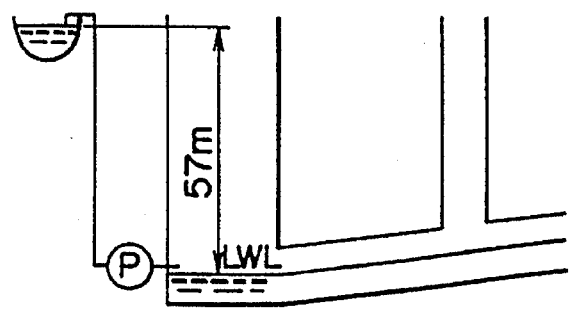

FIGS. 3A and 3B are views explanatory of the water level at which the pump is started in the open channel-closed channel mixed flow operation.

Figure 4:
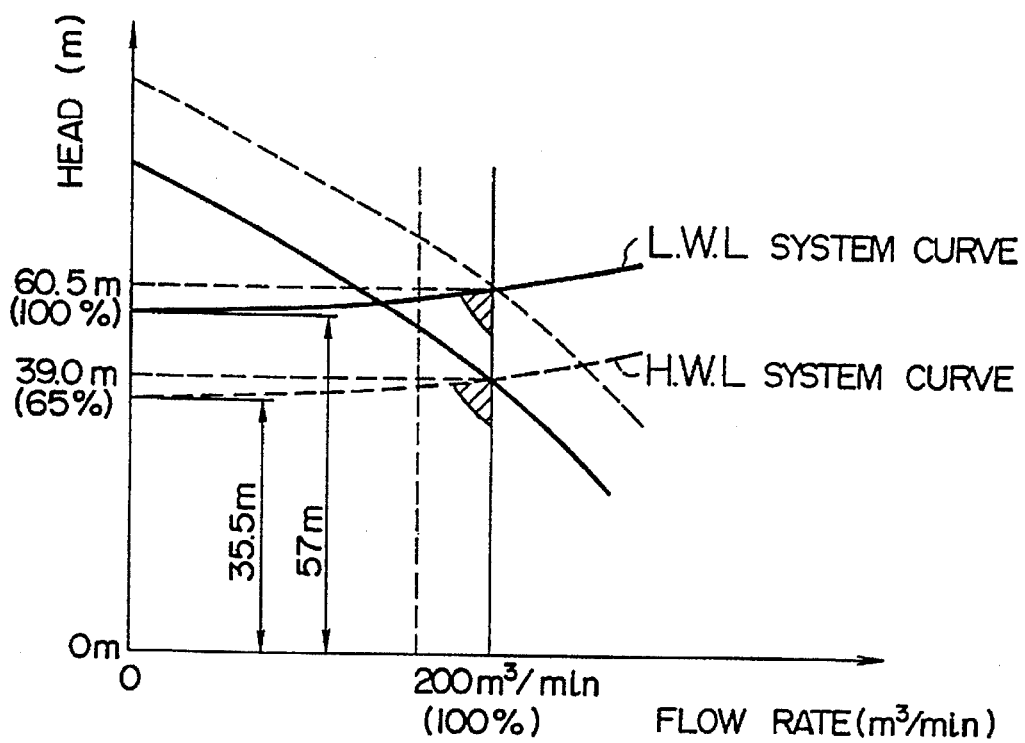
FIG. 4 is a diagram explanatory of pump characteristics in the embodiment of the invention.

FIG. 4 is a diagram explanatory of pump characteristics of this embodiment and the prior art technique.

Generally, the total pump head H is a value obtained by adding a discharge conduit loss to an actual pump head Ha, and can be expressed by the following formula:

$$H = \text{actual pump head } Ha \text{ (water level of discharge water tank} - \text{water level } W\!L \text{ at the time of starting of pump)} + \text{discharge conduit loss}$$

For example, if the actual pump head Ha and the discharge conduit loss are 57 m and 3.5 m, respectively, as indicated in a solid line in FIG. 4, the total head H is as follows:

$$60.5 \text{ m} = 57 \text{ m} + 3.5 \text{ m}$$

The conventional open channel flow operation is designed to obtain a rated flow rate at a total head H at which the water can be pumped from the lowest water level L.W.L, as indicated in a broken line in FIG. 4. In the case of the open channel-closed channel mixed flow operation, however, the draining needs to be effected at a rated flow rate in the closed open channel condition in which the water fills the underground channel 1 and further rises up into the vertical shafts 2. If the actual pump head Ha from the highest water level H.W.L is 35.5 m as shown in FIG. 3A, the total head H is as follows, in which case the discharge conduit loss is the same value of 3.5 m.

$$39.0 \text{ m} = 35.5 \text{ m} + 3.5 \text{ m}$$

Therefore, as will be appreciated from (39.0/60.5=0.644), the total head H is reduced to 64.4%.

In the open channel flow operation of the open channel-closed channel mixed flow operation, the water level at which the pump is started is the lowest water level L.W.L, and therefore the actual pump head Ha increases, as shown in FIG. 3B; however, the water level is low, and hence the risk is low, and therefore the rated flow rate is not required, and the pump needs only to be operated at the flow rate obtained with the total head H at this time.

If the diameter of the conduit or pipe of the underground channel 1 is 10 m, and the water level (the lowest water level L.W.L) at which the pump 7 is started is a level of 30%~90% of the pipe diameter, the position at which the pump is mounted can be 3~9 m above that employed in the conventional drainage system, and therefore the excavation cost can be reduced.

Thus, in this embodiment, the water level (W.L) at which the pump is started at the rated flow rate rises from the lowest water level L.W.L (which has been employed in the convention system) to the highest water level H.W.L. Therefore, the capacity of the pump can be reduced, and an output of a diesel engine for driving the pump can be reduced, and hence fuel consumption can be reduced.

The underground channel 1 extends a long distance, and therefore channel 1 can temporarily store a large volume of water. For example, the underground channel 1 has a pipe diameter of 10 m, a length of 10 km and a capacity of about 400,000 m$^3$, and has a storage time of about 30 minutes for the pump having a capacity of 200 m$^3$/sec. This time allowance makes it possible to mount the pump 7 at a higher level, and because of a reduced risk of increase of the water level, the pipe diameter of the underground channel 1, which has been conventionally, for example, 12.5, m can be reduced to 10 m. Because of the reduced pipe diameter of the underground channel 1, the cost of excavating the underground channel 1, which accounts for a large proportion of the installation cost of the large-depth underground drainage facility, can be reduced. And besides, the hunting produced by frequent starting and stop of the pump 7 is prevented by the above storage effect.

Next, the type of pump suited for the open channel-closed channel mixed flow operation will now be described.

Figure 5:
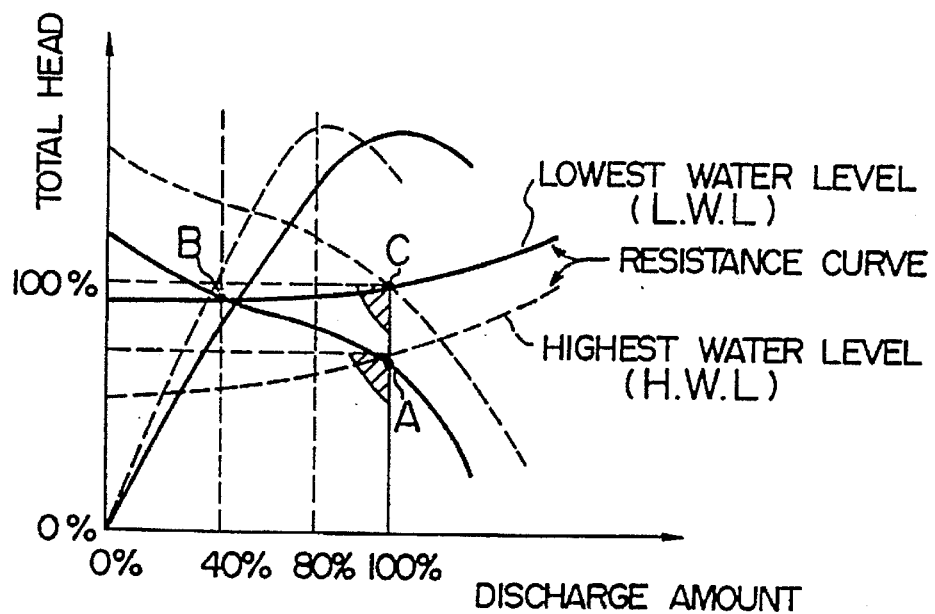
FIG. 5 is a diagram explanatory of pump characteristics suited for the open channel-closed channel mixed flow operation of the invention.

FIG. 5 is a diagram explanatory of pump characteristics suited for the open channel-closed channel mixed flow operation in an embodiment of the present invention.

As indicated by solid lines in FIG. 5, the pump suited for the open channel-closed channel mixed flow operation has such (total head H—discharge amount Q) characteristics as to provide a total head A at which the pumping from the highest water level H.W.L is possible at 100% of the rated flow rate in the closed channel flow operation, and also to provide a total head B at which the pumping from the open channel water level is possible at a minimum flow rate (40% of the rated flow rate). With this arrangement, the closed channel flow operation in which the pumping is required to be effected at the smaller total head at the rated flow rate, and the open channel flow operation in which the pumping is effected at the larger total head at the minimum flow rate can both be effected by the same pump, and therefore the number of pumps to be installed can be reduced.

A pump for effecting the conventional open channel flow operation is designed to achieve the maximum efficiency at a total head C at which the pumping from the lowest water level L.W.L is possible at a rated flow rate, as indicated by a broken line in FIG. 5. In this embodiment of the invention, however, the efficiency of the pump is determined to become maximum at a discharge flow rate (for example, 80% of the maximum flow rate) between that of the closed channel flow operation and that of the open channel flow operation. With this arrangement, the cost of the pump and drive machine for effecting the open channel-closed channel mixed flow operation can be reduced.

The above pump can be of the type in which the pitch of vanes is variable so as to provide the total head at which the pumping from the closed channel water level can be effected at the rated flow rate and also to provide the total head at which the pumping from the open channel water level can be effected at the minimum flow rate. With this arrangement, the closed channel flow operation and the open channel flow operation can both be carried out by the use of the same pump, and therefore the number of the pumps to be installed can be reduced.

Further, the above pump can be of a two-stage impeller type having impellers corresponding respectively to the total head, at which the pumping from the closed channel water level can be effected at the rated flow rate, and the total head at which the pumping from the open channel water level can be effected at the minimum flow rate. With this arrangement, the closed channel flow operation and the open channel flow operation can both be carried out by the same pump, and therefore the number of the pumps to be installed can be reduced.

Thus, there is used the closed channel-open channel mixed flow operation in which when the underground channel is in the closed condition, the pump is operated at the rated flow rate or at a flow rate larger than the rate of flow of the water into the pump station, and when the underground channel is in the open condition, the pump is operated at the minimum flow rate or at a flow rate smaller than the rate of flow of the water into the pump station. With this method, regardless of the condition of the underground channel, the large-depth underground drainage facility can be operated or run in a stable manner.

Next, an embodiment of a large-depth underground drainage facility of the invention for effecting a closed channel flow operation will now be described.

Figure 6:
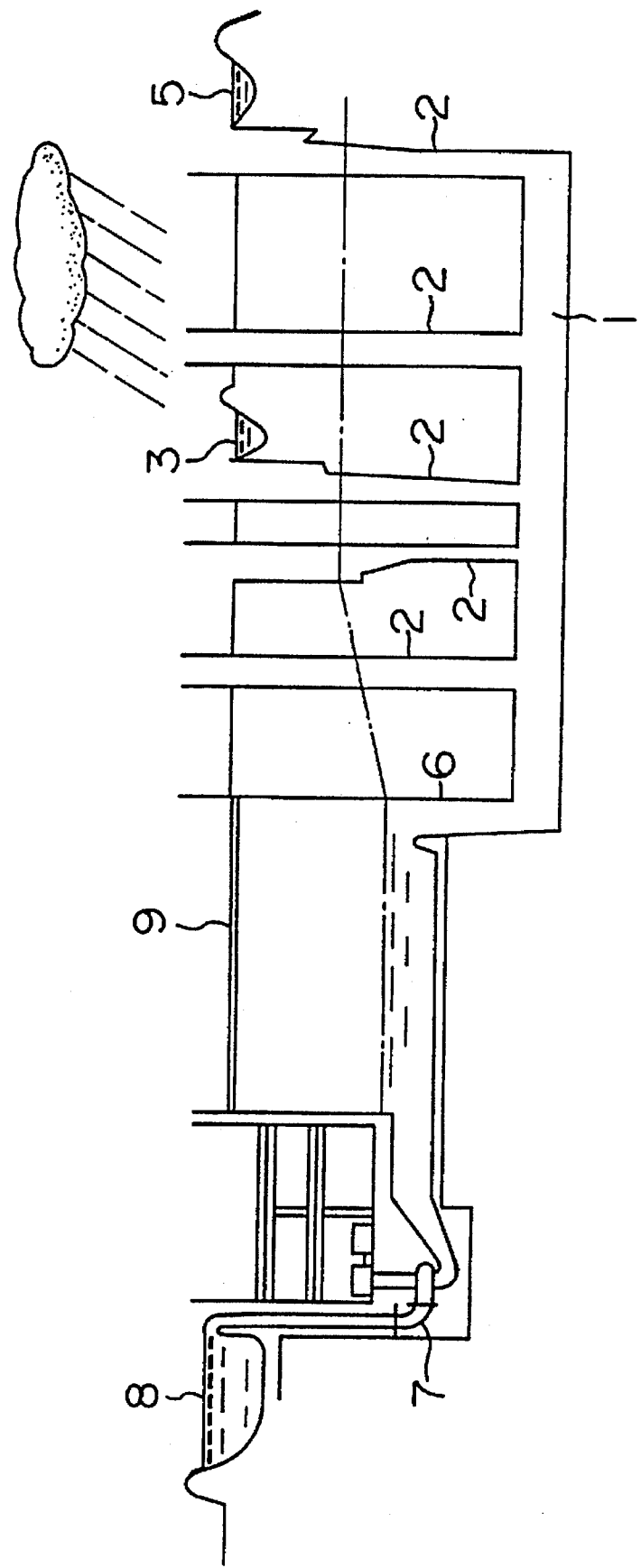
FIG. 6 is a view explanatory of an embodiment of the invention for carrying out a closed channel flow operation.

FIG. 6 is a view explanatory of the construction of the invention for effecting a closed channel flow operation.

As shown in FIG. 6, a pumping tank 9 of a large capacity is provided between a pump well 6 and a pump 7 in a large-depth underground drainage facility for effecting a closed channel flow operation. A storage effect of this pumping tank reduces the risk that water would overflow from an underground channel 1 to the ground surface, and therefore the diameter of the underground channel 1 can be reduced. The storage effect of the large-capacity pumping tank 9 also makes it possible to operate or run the large-depth underground drainage facility in a stable manner in the closed channel flow operation.

In the case where it is difficult to obtain a sufficient space or lot for constructing a pump station, a closed channel-open channel mixed flow operation system which does not need the large-capacity pumping tank 9 is selected. In contrast, where a sufficient space for the construction of the pump station is readily available, the closed channel flow operation system which requires a smaller pump head is selected. By doing so, the large-depth underground drainage facility can be constructed at a minimum cost.

A technique of accurately estimating and controlling the rate of flow into the pump station will now be described.

In order to effectively utilize the above-mentioned temporary storage effect in the underground channel, it is necessary that the rate of flow into the pump station be accurately estimated and controlled so that the drainage facility can be stably run in accordance with the rate of flow into the pump station. If this requirement is not met, the water overflows from the vertical shafts and the pump well.

Figure 7:
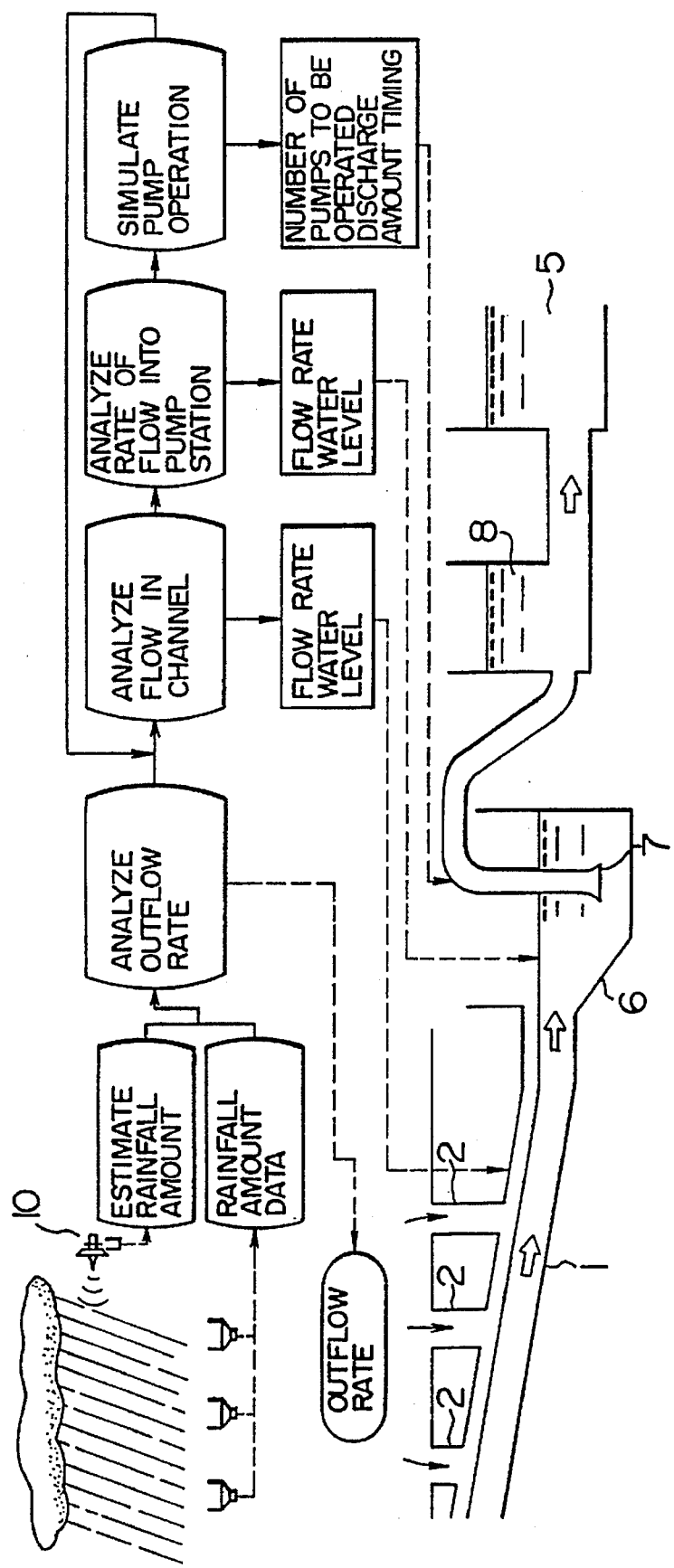
FIG. 7 is a diagram explanatory of an embodiment of the invention for accurately estimating and controlling the rate of flow into a pump station.

FIG. 7 is an illustration explanatory of an embodiment of the invention for accurately estimating and controlling the rate of flow into the pump station.

As shown in FIG. 7, the amount of rainfall is estimated in accordance with data from a rainfall radar 10, and rainfall data is collected from pluviometers (rain gauges) provided at predetermined locations. The amount of rainwater which will not penetrate into the ground but will flow into vertical shafts 2 is calculated by analyzing the estimated rainfall amount and the rainfall data, thereby determining an outflow amount. The amounts of flow into the vertical shafts 2 are totaled, and the flow in the underground channel 1 is analyzed, thereby calculating the flow rate and the water level in the underground channel 1. The rate of flow into the pump well 6 is analyzed from the flow rate of the underground channel 1, thereby calculating the rate of flow into the pump well 6 and the water level thereof. The operation of the pump is simulated from the rate of flow into the pump well 6 and the water level thereof to determine the number of pumps to be operated, a discharge amount of the pumps and the timing of starting and stop of the pumps, thereby controlling the pumps, and at the same time this data is fed back to the step of analysis of the flow in the underground channel 1.

Next, reference is made to another method of accurately estimating the rate of flow into the pump station in accordance with the invention, in which the amount of flow into the vertical shafts is accurately estimated in accordance with rainfall data or a change in time.

Figure 8:
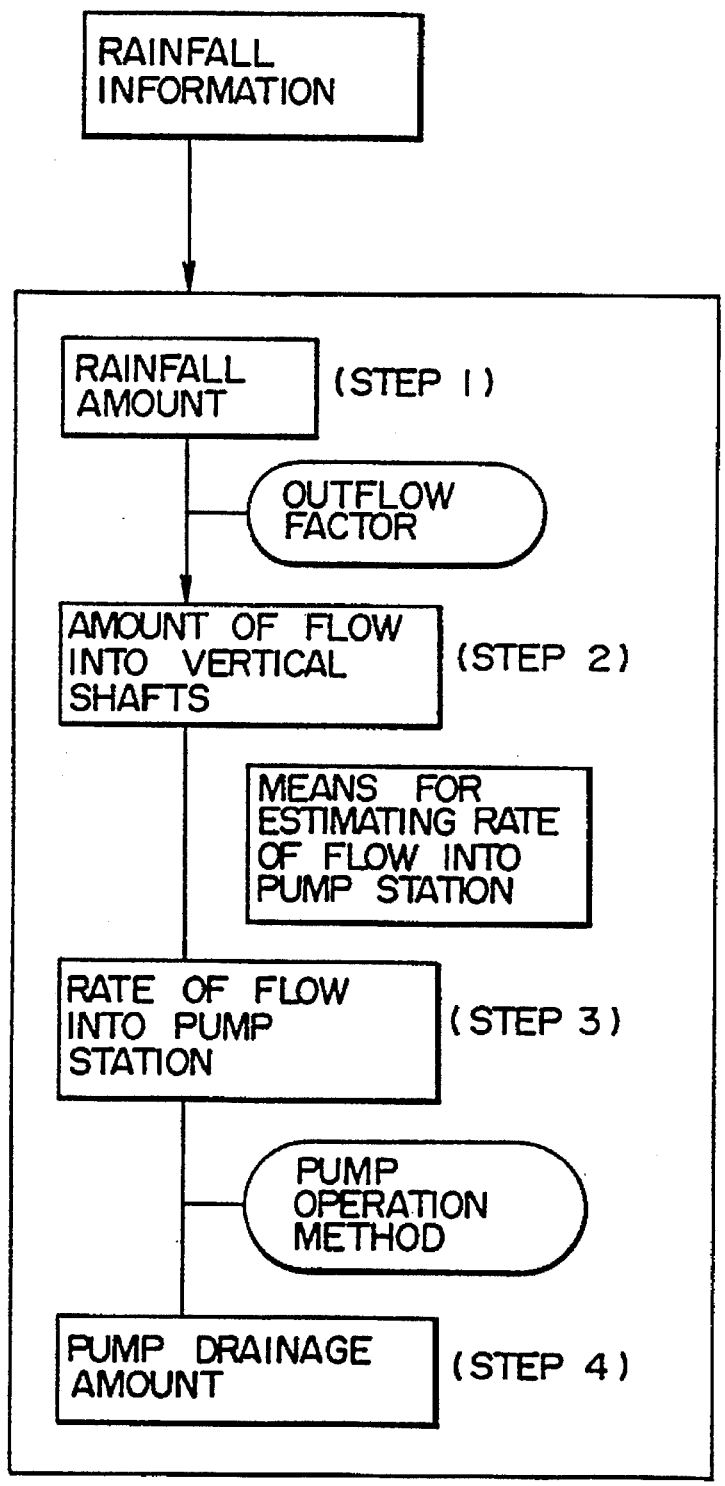
FIG. 8 is a flow chart of a procedure from rainfall to pump drainage in an embodiment of the invention.

FIG. 8 is a flow chart showing a procedure from rainfall to a step of determining a pump drainage.

Figure 9:
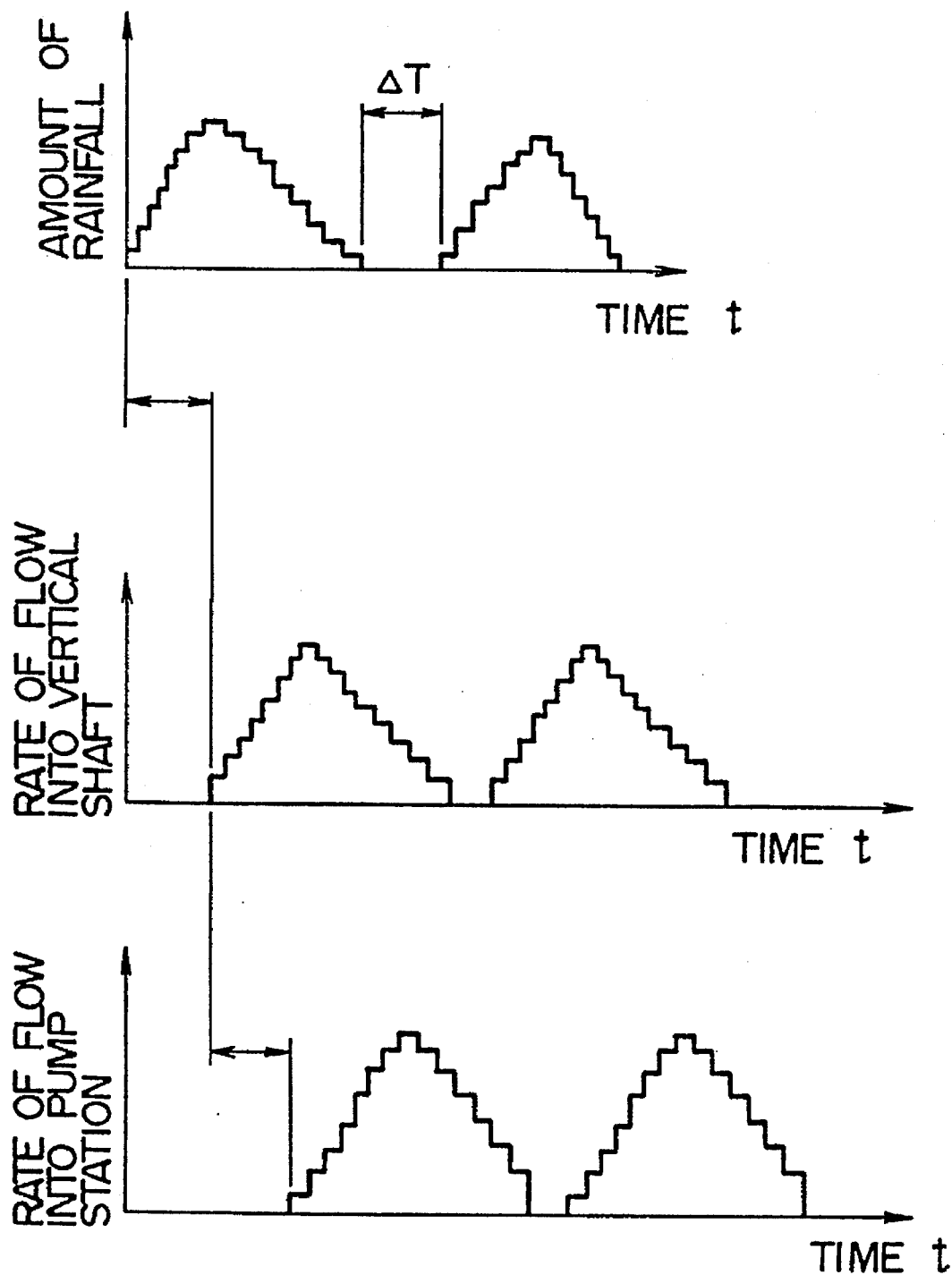
FIG. 9 is a diagram showing the relation between time and the amount of rainfall, as well as the relation between time and the inflow amount in an embodiment of the invention.

FIG. 9 presents diagrams showing the relation between time and rainfall and the relation between time and the rate of flow.

When rain falls in a district to be drained, a rainfall amount varying with time is decided from rainfall information (for example, a value in terms of mm per hour) in Step 1. Since the degree of penetration of the water into the ground greatly varies in accordance with the time interval $\Delta T$ between one rainfall and a subsequent rainfall, the amount of flow into the vertical shafts is varied, and therefore the outflow factor is changed in accordance with the rainfall pattern. For example, in accordance with $\Delta T$ in FIG. 9, the outflow factor is changed in the range of between 0.3 and 0.9. In Step 2, the amount of flow into the vertical shafts is found from this outflow factor and the rainfall amount. In Step 3, the rate or amount of flow into the pump station is found from the amount of flow into the vertical shafts, using a means for estimating the rate of flow into the pump station. In Step 4, a pump drainage (discharge) amount (that is, the number of the pumps to be operated and the discharge amount) is decided from the thus obtained amount of flow into the pump station and a pump operating method. The pattern of change in the rainfall shifts in a delayed manner to the pattern of flow into the vertical shafts, and then to the pattern of flow into the pump station, as shown in FIG. 9. Therefore, the above estimation is effected, taking these changes into consideration.

Generally, with respect to the rainfall pattern, the rainfall increases to a peak with time, and then decreases to zero with time, and the degree of penetration of the rain water into the ground varies in accordance with the time interval between a rainfall and a subsequent rainfall. For example, if the time interval is short, the rainwater hardly penetrates into the ground, but flows into the vertical shafts in a large amount. The outflow factor is changed in accordance with the time interval between the two sequential rainfall patterns, and the rainfall amount is calculated using this outflow factor, and the amount of flow into the vertical shaft is calculated from this rainfall amount, and then the rate of flow into the pump station is accurately estimated. With this method, the operation of the pump station can be properly controlled, and therefore the large-depth underground drainage facility can be run in a stable manner.

The following are examples of means for estimating the rate of flow into the pump stations:

1. Estimating means depending on physical simulation.
2. Estimating means depending on a change in water level of the vertical shaft at an upstream location.
3. Estimating means depending on the detection of a flash flood at an upstream location.
4. Estimating means depending on neuro having a learning function.

Among these, the estimating means depending on the detection of a flash flood at the upstream location will now be described in detail.

Figure 10:
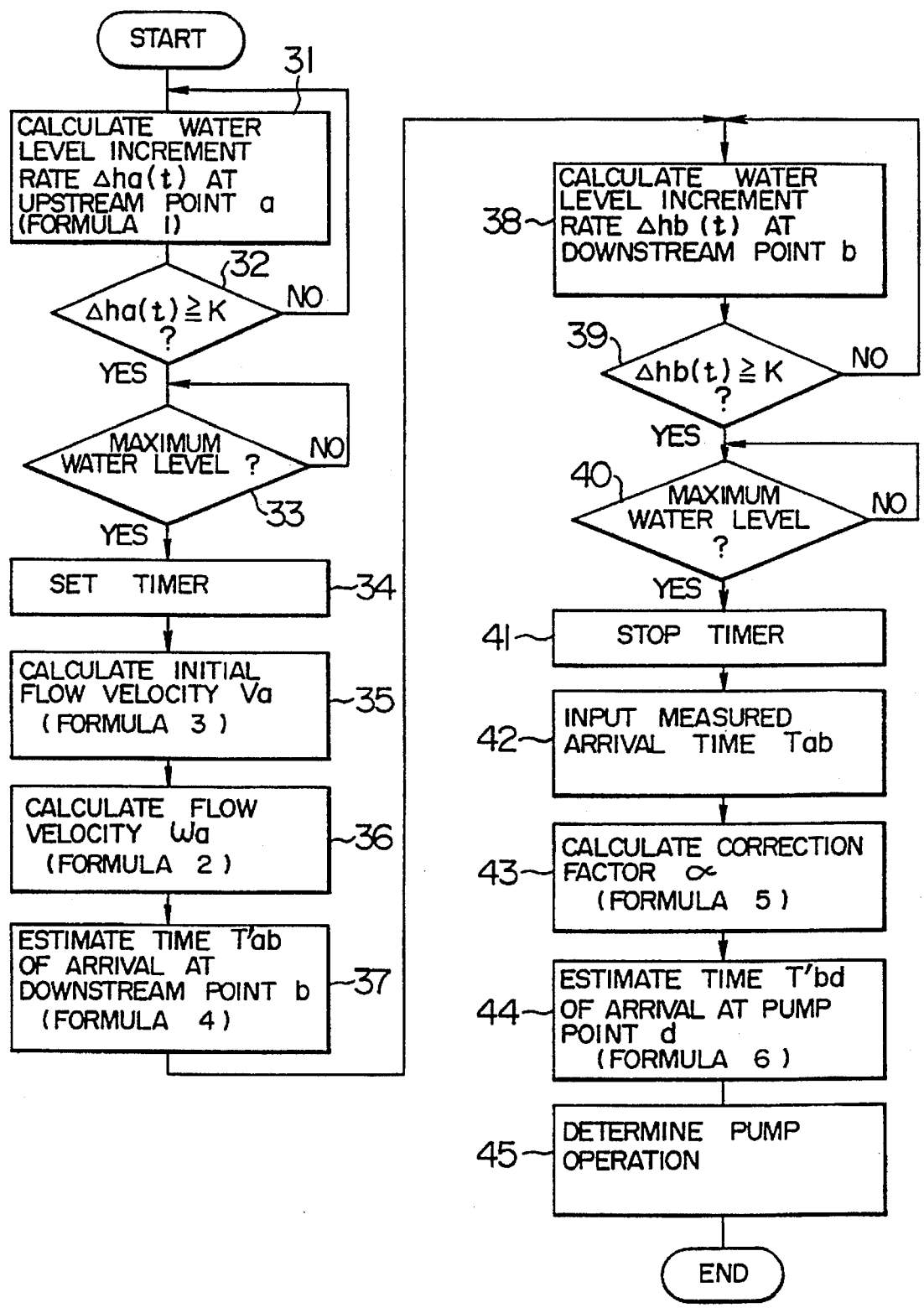
FIG. 10 is a flow chart of a procedure in the drainage system of the embodiment of the invention for detecting a flash flood and for estimating its arrival time.

FIG. 10 is a flow chart of a procedure for detecting a flash flood in a drainage system and for estimating the time of arrival of this flash flood.

Figure 11:
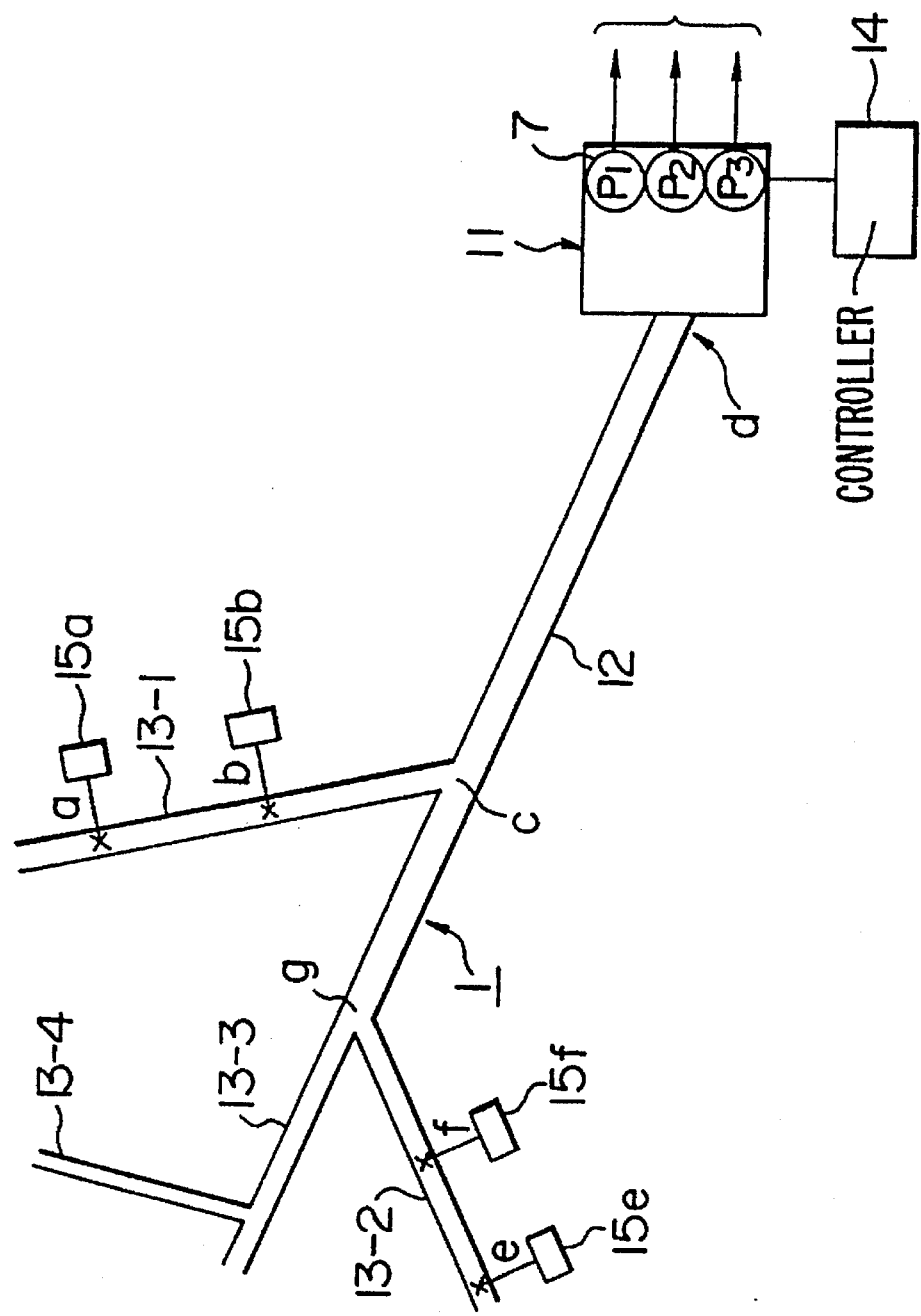
FIG. 11 is a view showing an overall construction of a drainage system according to an embodiment of the invention.

FIG. 11 shows an overall construction of one example of a drainage system.

As shown in FIG. 11, in the drainage system of this embodiment, a drainage pump station 11 is provided in the vicinity of a river to which drain water is to be discharged, and drain water such as rainwater is collected by an underground channel 1 provided in a district to be drained, and this drain water is led to the drainage pump station 11, and then is discharged from this station 11 to rivers. The underground channel 1 includes a main conduit 12 and a plurality of branch conduits 13-i (i=1~4 in the drawings). As shown in FIG. 11, the drainage pump station 11 includes a pump well 6 (not shown) for storing drain water entering from the main conduit 12, and pumps 7 for pumping the drain water from the pump well 6 to rivers for discharging purposes, and a pump controller 14 for controlling the operation of the pumps 7.

A water level detector 15a is provided at an upstream point a of the branch conduit 13-1, and a water level detector 15b is provided at a point b of the branch conduit 13-1 downstream of the point a. A water level detector 15e is provided at an upstream point e of the branch conduit 13-2, and a water level detector 15f is provided at a point f of the branch conduit 13-2 downstream of the point e. These water level detectors 15a, 15b, 15e and 15f act to detect the water level in the branch conduits, and can be of a conventional construction such as a capacitance type and an ultrasonic type. The values of the water levels of the above points detected respectively by the water level detectors 15 are transmitted to the pump controller 14 through a communication system (not shown). Although no water level detector is shown in the other branch conduits 13-3 and 13-4, they may be provided there, if necessary. Namely, it is only necessary to detect a flash flood of a large flow rate expected to arrive at the drainage pump station 11 the earliest, and to estimate this arrival time. Therefore, in this embodiment, in view of the overall construction of the drainage system and geographical features of the district to be drained, the water level detectors 15 are provided at those branch conduits which cover a large area of the district to be drained and are disposed nearer to the drainage pump station 11, thereby detecting a flash flood.

In the drainage system of this construction, normally, the drainage capacity, such as the number of the pumps $P_1$, $P_2$ and $P_3$ to be operated and the number of revolutions of the pumps, is automatically controlled by the pump controller 14 in accordance with the water level in the drainage pump station 11, thereby adjusting the drainage rate. Also, the pumps are automatically controlled in accordance with information obtained from conventional means for estimating the amount of flow into the drainage pump station.

The detection of a flash flood and the estimation of the time of arrival of the flash flood at the pump station in this embodiment, as well as the operation, will now be described in detail with reference to FIG. 10.

Basically, the detection of a flash flood and the estimation of the arrival time are effected under the control of the pump controller 14 in accordance with the water level data detected by the water level detectors 15a, 15b, 15e and 15f. The pump controller 14 comprises a computer, and receives thereinto the water level data transmitted from the water level detectors 15a, 15b, 15e and 15f, at predetermined sampling intervals, and processes the input signals in an ordinary manner, and then store these data in a data table of a memory. The pump controller 14 suitably reads the thus stored water level data from the memory, and executes the process shown in FIG. 10.

FIG. 10 shows the process for dealing with a flash flood produced in the branch conduit 13-1. The same process is applied to the branch conduit 13-2, and therefore, here, explanation will be given only with respect to the branch conduit 13-1. The occurrence of a flash flood (downward flow) is detected in Steps 31 and 32. In the case of a flash flood, a pattern of change of the water level is such that the water level increases abruptly. Therefore, in this embodiment, a detection value ha(t) of the water level at the upstream point a is sampled, and the difference between this detection value and a water level detection value ha(t−1) obtained in a preceding cycle is calculated by the use of the following formula (1) to obtain an increment rate Δha(t) of the water level (Step 31).

$$\Delta ha(t) = ha(t) - ha(t-1) \tag{1}$$

Then, it is judged whether or not the increment rate Δha(t) is equal to or larger than a predetermined value (flash flood judgment reference value) k (Step 32). If this judgment is in the negative (that is, "NO"), the procedure returns to Step 31, and the same processing is repeated with respect to subsequent data. In contrast, if the judgment is in the affirmative (that is, "YES"), a judgment is made of whether the water level has reached a maximum water level (hm) of the flash flood in Step 33. For effecting this judgment, a change in water level detection value ha(t) in the above-mentioned data table is monitored, and a detection value indicative of a maximal value is specified as the maximum water level. A timer is set to the timing of detection of the maximum water level, and time is measured until this flash flood arrives at the downstream point b (Step 34). When the flash flood is detected, an alarm may be given in response to this detection signal, or the occurrence of the flash flood and the point of occurrence of the flash flood may be displayed in a display device such as a graphic panel. The flash flood can be detected not only by the above water level increment rate but also by the fact that the water level exceeds a predetermined value or the fact that the turbidity of the drain water becomes abnormally high. Subsequent Steps 35 to 43 are designed to find a correction factor α in order to more precisely estimate the time of arrival of the flash flood by a hydraulics calculation. It is thought that various methods based on conventional hydraulics models can be used as the principle of estimation of the arrival time; however, in this embodiment, in view of the time required for processing the estimation, a simple method depending on a hydraulic bore model is adopted. A propagation velocity (flow velocity) ω of the flash flood in this bore model is expressed by the following formula (2). This model is designed for a conduit of a rectangular cross-section, but even in the case of a conduit of a circular cross-section, this model can also be used by suitably modifying variables.

$$\omega = V + \sqrt{\frac{g \cdot hm}{2ho}(ho + hm)} \tag{2}$$

where ho represents an initial water level of a leading end of the flash flood, V represents an initial flow velocity at the initial water level ho, and g represents a gravitational acceleration. The initial flow velocity V is obtained from the following formula (3).

$$V = \frac{1}{n} \sqrt[3]{(ho)^2} \cdot \sqrt{I} \tag{3}$$

where n represents a coefficient of roughness of the conduit, and I represents a gradient of the conduit. Therefore, if the flow velocity ω is found, the time of arrival at a downstream point in the same drainage conduit can be found by dividing this distance (to this downstream point) by ω.

According to the above hydraulics theory, an initial velocity Va at the point a is found by the formula (3) (Step 35). Then, in Step 36, the flow velocity ωa is found by the formula (2). Then, in Step 37, an estimated value T'ab of the time of arrival at the point b spaced a distance Lab from the point a is calculated by the following formula (4).

$$T'ab = Lab/\omega a \tag{4}$$

In subsequent Steps 38 to 40, the flash flood and a maximum water level hm at the point b are detected. This processing is the same as that of Steps 31 to 33, and therefore explanation thereof is omitted here. At the time at which the arrival of the maximum water level of the flash flood at the point b is detected in Step 40, the above-mentioned timer is stopped (Step 41), and a measured value Tab of the time required for the flash flood to arrive at the point b from the point a is found (Step 42). Then, in Step 43, the correction factor for the estimated time is calculated by the following formula (5).

$$\alpha = Tab/T'ab \tag{5}$$

Usually, since the measured value is larger than the theoretically estimated value, there is provided α ≦ 1.0.

Then, an estimated time T'bd required for the flash flood to arrive at the pump point d from the point is calculated by the following formula (6).

$$T'bd = \alpha(T'bc + T'cd) \tag{6}$$

T'bc and T'cd in this formula are estimated basically by the use of the formulas (2), (3) and (4); however, since the main conduit 12 is different from the branch conduit 13-1 in conduit conditions such as the conduit diameter, the initial water level ho and the maximum water level hm are estimated based on detected values of the point a through proportional calculation. In this case, for estimating the initial water level ho, the rate of flow of drain water into the joint point c from the other branch conduits 13-2, 13-3 and 13-4 should be taken into consideration. Therefore, preferably, a water level detector is provided at the Joint point c to detect the initial water level ho; however, when the flash flood in the branch conduit 13-1 arrives at the joint point c the earliest, the rate of flow into the joint point c from the other branch conduits is not different from the normal flow rate at this time. Therefore, a correlation coefficient is beforehand established based on actual data of the flow rate ratio of the branch conduits obtained in the past, and the initial water level at the joint point c can be estimated by multiplying the initial water level of the point a by this correlation coefficient. In this embodiment, this method is adopted. In this embodiment, it is only necessary to estimate the arrival time of that flash flood expected to arrive at the drainage pump point the earliest, and therefore if a flash flood produced in the branch conduit 13-2 arrives at the joint point c the earliest (that is, earlier than a flash flood produced in the branch conduit 13-1), the arrival time T'fd is estimated with respect to the flash flood in the branch conduit 13-2.

In Step 45, based on the thus estimated arrival time T'bd, the number of the drainage pumps to be operated or run and the timing of initiating the operation of the pumps are determined, and also in accordance with this determination, a preceding standby operation for the flash flood is controlled. Usually, since there are provided a plurality of drainage pumps, the number of the pumps to be operated is determined according to the magnitude of the flash flood.

As described above, in this embodiment, the water level of the drainage channel at the upstream point a is detected, and it is judged whether or not the increment rate thereof is abrupt, and therefore the occurrence of the flash flood is detected rapidly. With this method, a countermeasure operation of the drainage pumps can be effected well in time.

Based on the degree (the water level or the increment rate) of the flash flood, the distance from the point of detection of the flash flood to the drainage pump point and the conditions of the drainage channel, the time required for the flash flood to arrive at the drainage pump point is estimated or computed in accordance with the hydraulics theory. Therefore, a counter-measure operation of the drainage pumps can be effected well in time.

Then, in accordance with this estimation results, the number of the pumps to be operated beforehand, as well as the timing of starting this operation, is determined. Therefore, the arrival of the flash flood can be easily dealt with.

The time, during which the preceding standby operation of the drainage pumps can be effected is limited by the cooling system for bearings of the pumps; however, the time of the preceding standby operation can be optimized by the above estimation, and damage to the pump bearings can be prevented. The following can be used as means for controlling the rate of flow into the vertical shafts, as well as the rate of flow into the pump station:

(1) Control of the rate of flow into the vertical shafts from a plurality of drainage channels.

(2). Control of the rate of flow into the pump station by a movable weir.

(3) Draining of the open channel/closed channel.

(4) Control of a plurality of stations in a totalized manner.

(5) Control of the flow rate at the discharge (delivery) side of the pump by an overflow weir.

1) Reference is first made to the means for controlling the rate of flow into the vertical shafts from a plurality of drainage channels.

Figure 12:
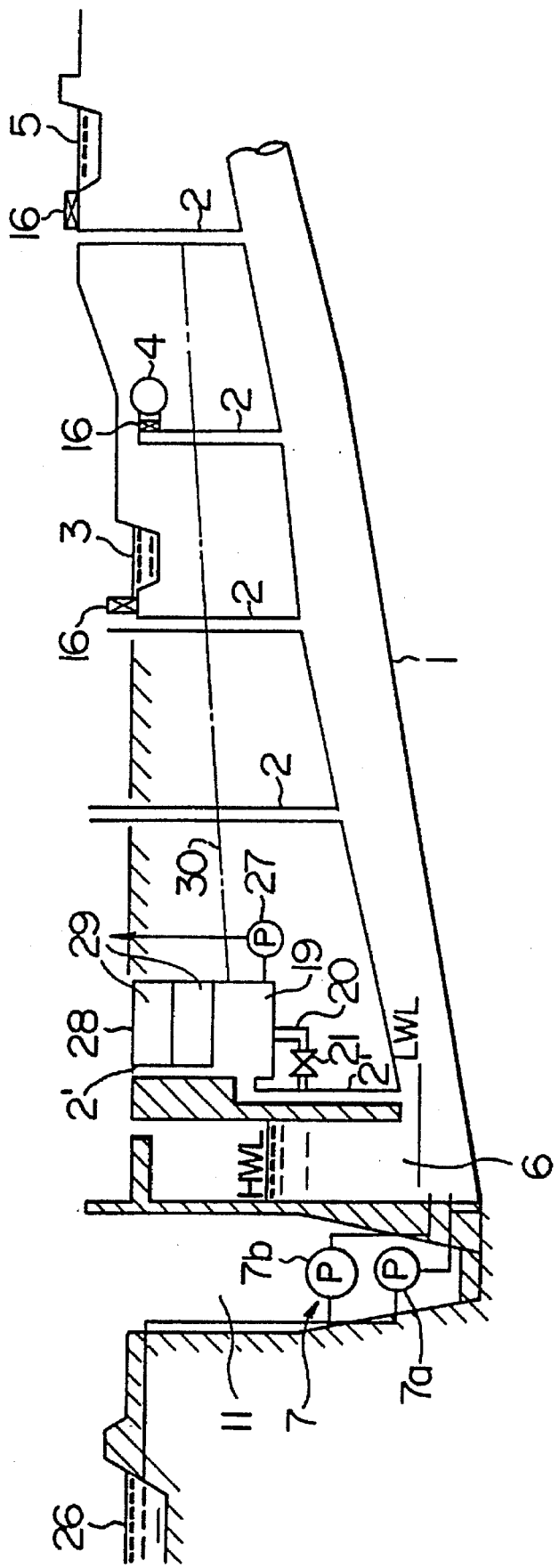
FIG. 12 is a vertical cross-sectional view showing an embodiment of an underground drainage facility of the invention.

FIG. 12 shows an embodiment of an underground drainage system of the invention. As shown in FIG. 12, movable flow rate adjustment devices 16 are provided respectively in flow channels leading from rivers 5, conduits 4, and flood control channels 3 to respective vertical shafts 2. With this arrangement, the rate of flow into an underground channel 1 from the rivers, conduits, and flood control channels is adjusted, and the rates of flow into the vertical shafts 2 from the respective rivers, conduits, and flood control channels can be adjusted independently of one another in accordance with the water level or the flow rate of the rivers, conduits, and the flood control channels.

2) Reference is now made to the means for controlling the rate of flow into the pump station by the movable weir.

Figure 13:
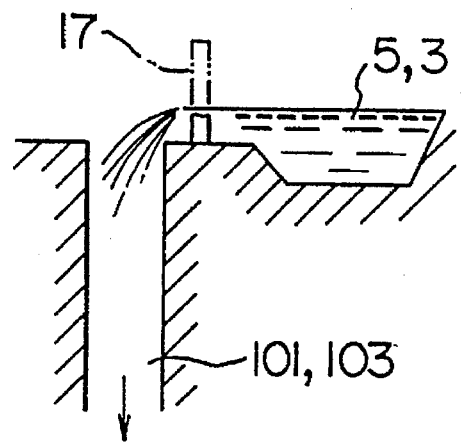
FIG. 13 is a vertical cross-sectional view showing a movable weir serving as a movable flow rate adjustment device of FIG. 12.

FIG. 13 shows an arrangement in which the movable flow rate adjustment device 16 as shown FIG. 12 is constituted by a movable weir 17. The movable weir 17 is movable vertically so as to adjust the height thereof, as shown in FIG. 13. The movable weir 17 may be of a swing type, but in a large-scale system, the movable weir shown in FIG. 13 is preferred, because the control power can be small, and foreign matter is less liable to be caught by the weir.

Figure 14:
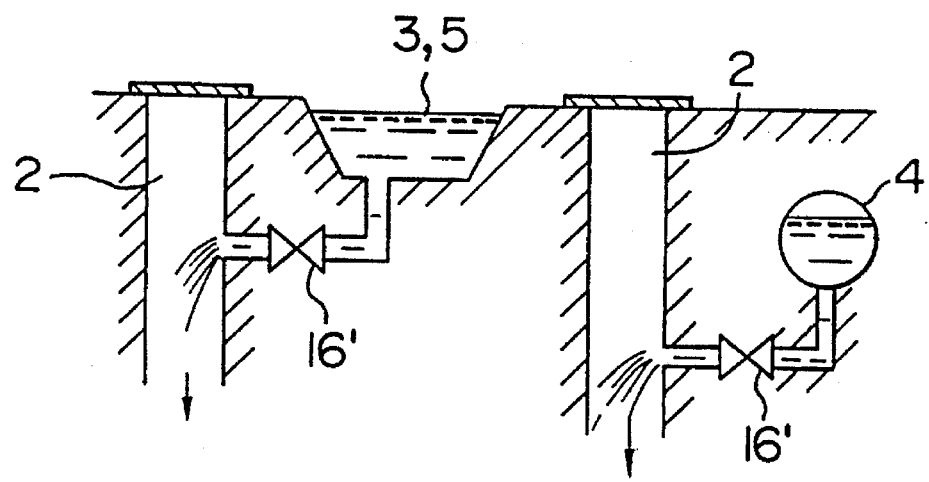
FIG. 14 is a vertical cross-sectional view showing a valve serving as the movable flow rate adjustment device of FIG. 12.

FIG. 14 shows an arrangement in which flow channels leading to vertical shafts 2 from rivers 5, conduits 4, and flood control channels 3 are constituted respectively by conduits, and a flow rate adjustment device 16 as shown in FIG. 12 is constituted by a valve 16'. In this case, preferably, the valve 16' is in the form of a butterfly valve which is capable of adjusting the flow rate, and which can be manufactured relatively large-sized.

Next, a method of running the underground drainage system of the above construction will be described. In accordance with the operating condition of the pumps 7, the water level of the underground channel 1, the overall inflow rate (or the estimated inflow rate), and the water levels of the rivers, conduits and flood control channels, an optimum rate of flow (inflow rate) from the rivers, conduits and flood control channels is determined, and the flow rate is adjusted to an optimum value by the flow rate adjustment devices 16. For example, if a sufficient amount of water flows into specific rivers, conduits, and flood control channels, depending on the weather condition, to cause a risk of submergence, these rivers, conduits, and flood control channels are preferentially drained in so far as the operating condition of the pumps 7, the water level of the underground channel 1 and the overall inflow rate allow this. By doing so, damage by submergence is prevented, and the ability of the drainage system can exhibit itself to a maximum degree.

Figure 15:
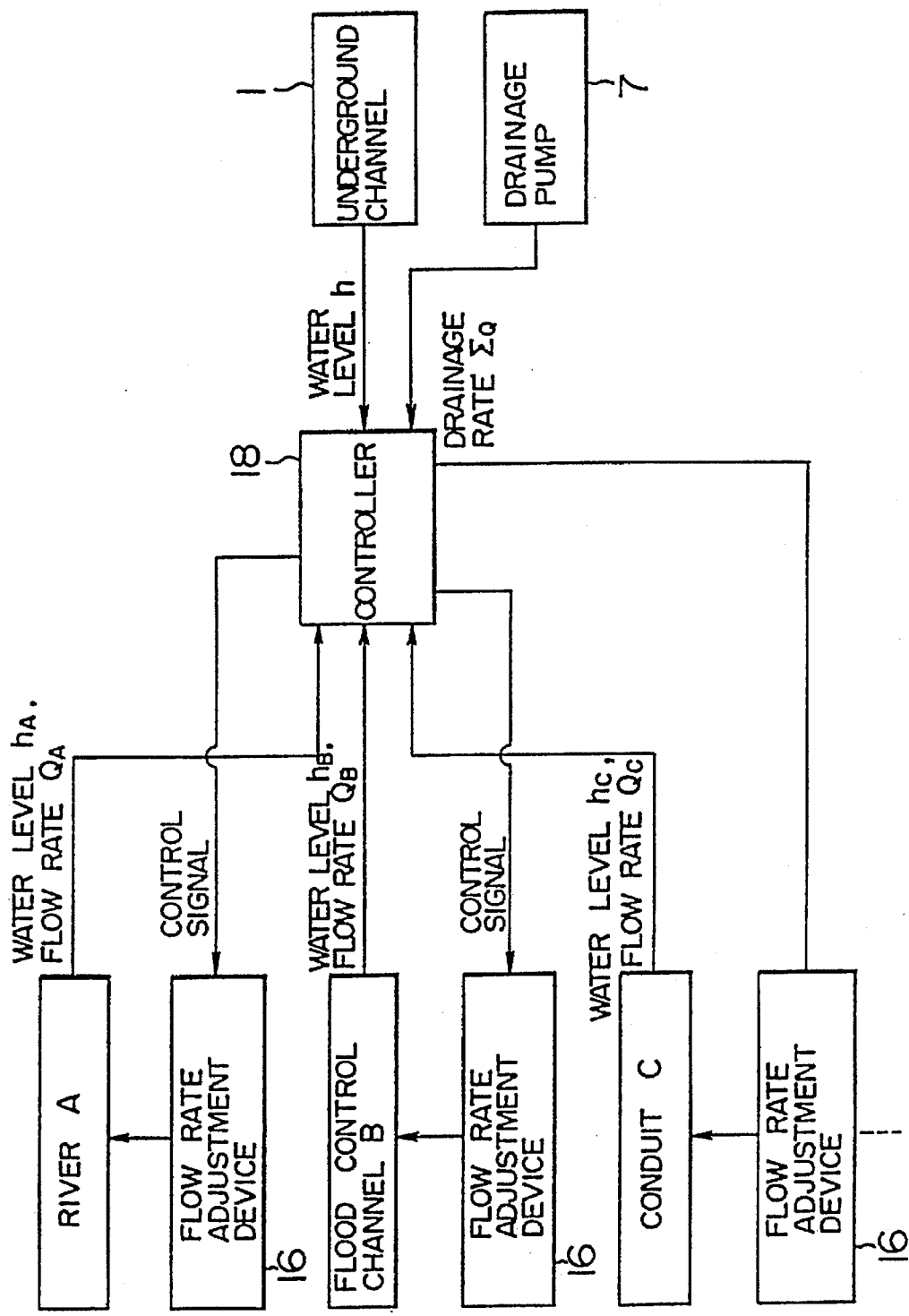
FIG. 15 is a block diagram of flow rate adjustment devices for determining the optimum rate of flow from rivers and flood control channels and for adjusting the flow rate to an optimum value.

FIG. 15 is a block diagram showing an arrangement of the invention in which the optimum rate of flow from the rivers, conduits, and flood control channels is determined, and the flow rate is adjusted by the flow rate adjustment devices to an optimum value.

As shown in FIG. 15, let's assume that rivers A, flood control channels B and conduits C are controlled by the underground drainage facility. A controller 18 always monitors the water levels of the rivers A, flood control channels B and conduits C, a rate Q of flow into vertical shafts 2, the water level of the underground channel 1, and a drainage rate $\Sigma Q$ of the drainage pumps.

If the amount of rainfall in the basin of the river A is large with the water level of this river rising, the operating condition of the pumps 7 is confirmed from the water level of the underground channel 1 and the drainage rate of the pumps 7, and if there is room for the capacity of the pumps, a control signal is sent to the flow rate adjustment device 16 to increase the rate Qa of flow from the river A. The controller 18 can be adjusted such that at this time, even if there is no room for the capacity of the pumps 7 while there is room for the capacity of the flood control channel B and the conduit C with respect to the water levels, and if the rate of increase of the water level in the river A is so high that there is a risk of submergence, control signals are sent respectively to the flow rate adjustment devices 16 for the flood control channel B and the conduit C to decrease the flow rates Qb and Qc, and then the rate Qa of flow from the river A is increased. With this method, the function of the drainage system of this embodiment can exhibit itself fully, and the reliability of the drainage system can be enhanced.

If on the basis of the rates of flow of rain water from the rivers, conduits and the flood control channels or the estimated flow rates thereof, these rivers, conduits and flood control channels are expected to send out an abrupt flow, the drain water is beforehand led preferentially from such rivers, conduits and flood control channels into the underground channel 1, thereby increasing the water level to a minimum level enabling the operation of the pumps. Then, the pumps are started to effect the draining, thereby decreasing the water level of such rivers, conduits and flood control channels to a level near to their lowest level. Thus, utilizing the storage effect of the rivers, conduits, and flood control channels, the standby running of the pumps can be effected in preparation for an abrupt flow into the underground channel 1.

At this time, if the pump 7 comprises a movable vane pump or a pump capable of varying the number of revolutions and is operated to drain at a low flow rate, the draining ability of the rivers, conduits and flood control channels under the influence of gravity can be utilized to a maximum degree for an effective standby running.

FIG. 16 shows an example in which a movable weir 17 is provided at a point of the underground channel 1 disposed upstream of the pump station. With this arrangement, dirty water, produced at an initial stage of the flow, is prevented from flowing into the pump well 6, and the reliability of pumps 7 is further enhanced.

In the open channel condition of this drainage system, if the starting of the pump 7 is delayed, for example, because of an imperfect condition of the pump 7, the movable weir 17 is closed, thereby utilizing the storage effect of the underground channel 1 to its maximum.

Furthermore, with this construction, the height of the movable weir 17 is adjusted in accordance with the rate of flow from the rivers, conduits, and flood control channels or the estimated flow rate thereof, thereby stabilizing the water level of the pump well 6. Therefore, particularly in the case of the large-scale pump system, the reliability of the pumps 7 can be enhanced.

Next, the draining in the open channel condition of the underground channel, as well as the draining in the closed channel condition, will now be described. Pumps, which are capable of draining a planned amount of water in the closed channel condition of the inflow channel and are not brought into no-discharge operation even in the open channel condition, are mounted in the pump well. The pump is of a movable vane type, and effects a draining standby operation when the vane angle is near to a minimum angle. In accordance with the increase of the water level of the pump well or the rate of increase of this water level, the vane angle of the pump is adjusted to regulate the rate of the draining. The pump may be of a rotational speed control type, in which case the draining standby operation is effected at low speed, and in accordance with the increase of the water level of the pump well or the rate of increase of this water level, the number of revolutions of the pump is adjusted to regulate the rate of the draining. Alternatively, small-capacity high-head pumps, which are capable of draining a planned amount of water in the open channel condition of the underground channel and effect a draining standby operation, and large-capacity low-head pumps, which are capable of draining a planned amount of water in the closed channel condition, may be mounted in combination in the pump well. A valve is dispensed with at the discharge side of the pump, and instead an overflow weir or a siphon may be provided at this discharge side so as to control the flow rate.

The following means can be used for running the large-depth underground facility (the pump station) in a stable manner:

(1) Draining standby operation by controlling the pump vane angle and the number of revolutions of the pump.

(2) Preceding standby operation of the pumps.

(3) Combination of small-capacity high-head pumps and large-capacity low-head pumps.

(4) Application of preferential draining algorithm.

(5) Correction of the pump on-and-off water levels in accordance with the rate of increase and decrease of the water level in the pump well.

(6) A surge prevention reservoir provided in the vicinity of the pumps for temporary storage and advanced flow.

(1) The standby draining operation by controlling the pump vane angle and the number of revolutions of the pumps is described above in detail, and this method is also effective for a stable operation of the pump station.

(2) The preceding standby operation of the pumps is such that in accordance with the estimated rate of flow into the pump well, the valve in a discharge channel is opened before the inflow water reaches the pump well and the operation of the pumps are started.

FIG. 17 is a vertical cross-section of a modification of the embodiment of FIG. 12.

As shown in FIG. 17, a valve 21 is provided in a discharge channel 20 which communicates a reservoir 19 with an underground channel 1. A pumping tank 22 is provided at a downstream end of the underground channel 1, and pumps 7 are immersed in the water in the pumping tank 22. A circulation conduit 25 branches off from that portion of a discharge conduit 23 disposed upstream of a discharge valve 24 and is in communication with the underground reservoir 19. A valve 21-2 is provided in the circulation conduit 25. When rain falls, the rate of flow into the pumping tank 22 is estimated, and before the inflow water reaches the pumping tank 22, the valve 21 in the discharge channel 20 is opened to supply water from the underground reservoir 19 to the pumping tank 22. The thus discharged water reaches the pumping tank 22 a certain period of time later, so that the water level of the pumping tank 22 rises to a level enabling the operation of the pumps 7, and at this time the pumps 7 are started. Thus, when the discharged water flows into the pumping tank 22, the standby operation of the pumps is effected before the full-scale water flows into the pumping tank 22.

(3) The combination of small-capacity high-head pumps and large-capacity low-head pumps will now be described.

FIG. 12 is a vertical cross-sectional view of the construction of the drainage facility of this embodiment.

Generally, the deeper the underground channel 1 is, the greater the difference between the lowest water level LWL and the highest water level HWL is. In the underground drainage facility, when the water level of the pump well 6 is low, the rate of discharge (draining) can be small, and as the water level rises, the rate of draining is increased. Therefore, as shown in FIG. 12, the pumps are provided in a vertically spaced manner, that is, in a multi-stage manner in a vertical direction, each pump being designed to drain at a required rate. Preferably, the high-head pump 7a is provided in the lower stage, and the low-head pump 7b is provided in the upper stage. In this case, the low-head pump 7b is provided at a level lower than the bottom of the underground reservoir 19.

With this construction, the difference between the level of the upper-stage pump 7b and the water level of a river (or the sea) 26, to which the drain water is to be discharged, is decreased, and the necessary head is reduced accordingly. This saves the power required for the draining operation. Particularly, if the rating of the upper-stage pump 7b is a low head and a large capacity so that the pump can be started in accordance with the increase of the water level, the power for the draining operation is greatly reduced because the pumping efficiency of the low-head large-capacity pump is high over a wide range. When the water level of the pump well 6 is low, it is not necessary to rapidly drain the water, and therefore the lower-stage pump 7a needs only to have a small capacity though it has a high head.

Furthermore, since the plurality of drainage pumps are arranged in at least two stages, the required area or space of a building for the pump station can be reduced. As a result, the amount of labor including the excavating labor can be reduced, which suppresses an increase of the construction cost.

(5) The correction of the pump on-and-off water levels in accordance with the rate of increase and decrease of the water level of the pump well will now be described.

Figure 18:
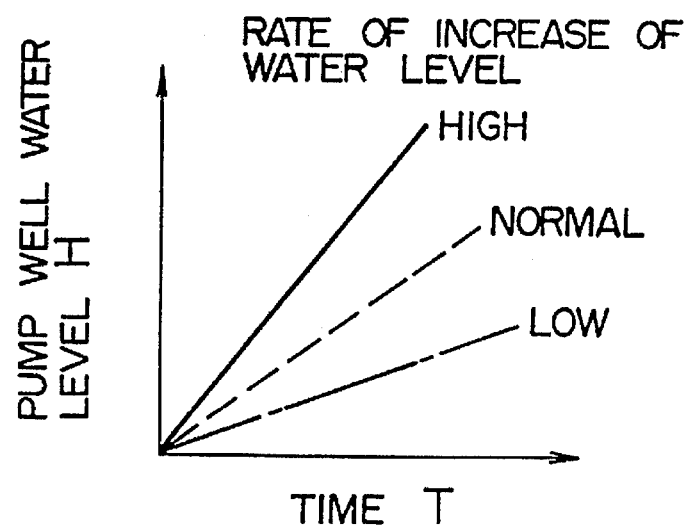
FIG. 18 is a diagram showing the rate of increase of the water level of the pump well in the embodiment of the invention.

FIG. 18 shows the rate of increase of the water level in the pump well in this embodiment. The solid line indicates a high increase rate of water level, the broken line indicates a normal increase rate water level, and the dot-and-dash line indicates a low increase rate water level.

Figure 19:
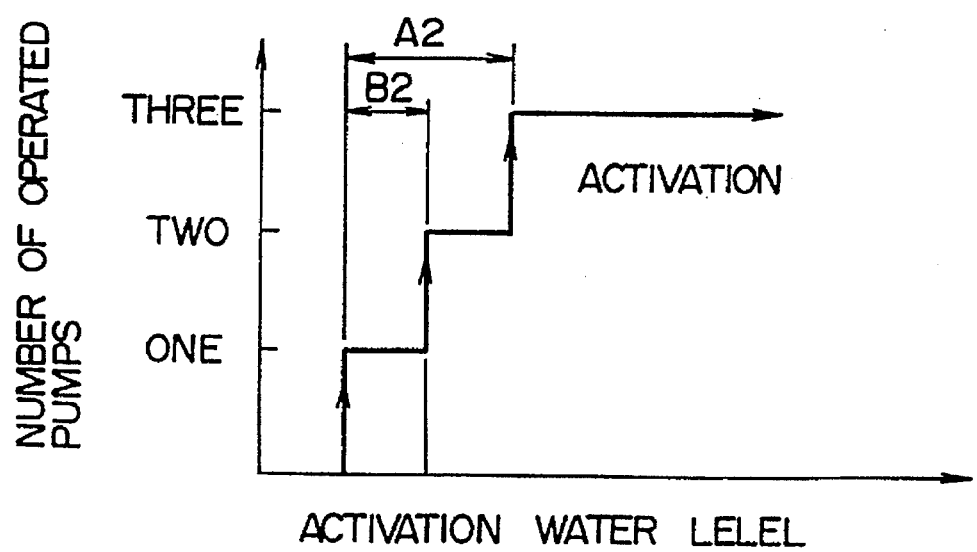
FIG. 19 is a diagram showing a pump starting pattern in the embodiment of the invention obtained when the rate of increase of the water level of the pump well is high.

FIG. 19 shows a starting pattern of this embodiment when the rate of increase of the water level in the pump well is great.

The water level at which the pump is started is lower by an amount B2 than the water level in the conventional construction. The difference between this water level and the water level for starting all the pumps (three pumps in this embodiment) is A2, and is smaller than that (A$_1$) obtained in the conventional construction. Namely, when the rate of increase of the water level is great, the first pump is started at the low water level, and the water level at which all of the pumps are started is also low. With this arrangement, an abrupt increase of the water level can be rapidly dealt with.

Figure 20:
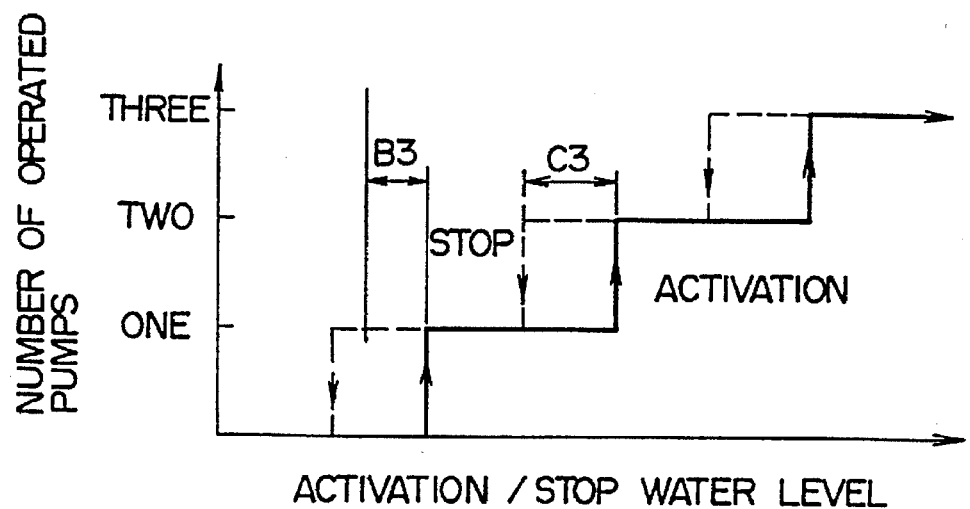
FIG. 20 is a diagram showing a pump starting pattern in the embodiment of the invention obtained when the rate of increase of the water level of the pump well is low.

FIG. 20 shows a starting pattern of this embodiment when the rate of increase of the water level in the pump well is small.

The first pump is started at a water level higher by an amount B3, and is stopped at a low water level. Namely, the difference (C3) between the water level for the starting and the water level for the stopping is greater than that (C1) in the conventional construction, and this is effective in preventing hunting.

(6) The surge prevention reservoir provided in the vicinity of the pumps for temporary storage and advanced flow will be explained hereinbelow.

As shown in FIG. 12, the underground reservoir 19 having a predetermined capacity is provided between the ground surface and the underground channel 1', and is disposed in the vicinity of the pump station (that is, on a relatively downstream side of the underground channel 1). The underground reservoir 19 is connected to the underground channel 1 via a vertical shaft 2'. An inlet of this vertical shaft 2' open to the underground reservoir 19 is provided at the side of the underground reservoir 19, and is disposed at a level higher than the bottom of the underground reservoir 19. The bottom of the underground reservoir 19 is connected to the vertical shaft 2' via the discharge conduit 20. A shut-off valve (opening-closing valve) or a gate valve 21 (hereinafter referred to as "shut-off valve") is provided in the discharge conduit 20 for opening and closing this conduit. The discharge conduit 20 may be connected directly to the underground channel 1. A pump 27 is connected to the bottom portion of the underground reservoir 19, and can pump storage water from the underground reservoir 19 to the ground surface. With this arrangement, the storage water can be effectively used for fire-extinguishing purposes and for sprinkling roads and parks. An upper portion of the underground reservoir 19 is open to the atmosphere via the vertical shaft 2'. A public facility such as a park 28 or an athletic field is provided on the ground surface above the underground reservoir 19, and an underground parking lot 29 is provided in a space between the ground surface and the underground reservoir 19.

The capacity of the underground reservoir 19 is decided to be larger than an amount obtained by subtracting the storage capacity of the underground channel 1 from a required storage capacity determined by the estimated inflow rate and the conditions (e.g. the draining ability of the pumps) of the draining system.

The operation of this embodiment, as well as a method of running the same, will now be described.

When rain falls to increase the water level of a river 5 and so on, the amount of water flowing into the underground channel 1 increases, so that the water level in the underground channel 1 rises in accordance with the amount of the rainfall. When the inflow water abruptly increases, for example, as a result of a localized torrential downpour, the underground channel 1 is fully filled with the water, and the water level in the vertical shaft 2' depending from the underground reservoir 19 abruptly rises, and therefore the water level reaches the level of the inlet of the underground reservoir 19 in accordance with the dynamic water gradient shown in FIG. 18. When the water level reaches this level, the underground reservoir 19 begins to store the water, so that the abrupt increase of the water level is alleviated. Therefore, a period of time elapse from the arrival of the inflow water (downward flow) at the pump well 6 to the initiation of the operation of the pumps 7 can sufficiently be arranged. Namely, even if the pumps 7 begin to be operated after the water level reaches the level of the inlet of the underground reservoir 19, the inflow water is prevented from reversely flowing into the river 5, the conduit 4 and the flood control channel 3 to lead to submergence.

While the total draining capacity of the pumps 7 is determined in accordance with the estimated inflow rate, it is usually set in accordance with the amount of inflow per unit time. Therefore, by initiating the operation of the pumps 7 after the water level reaches the underground reservoir 19, the increase of the water level can be suppressed.

In the present invention, the total head of the pump is reduced, and the pump as well as a prime mover is of a compact size, so that the space for the pump station is saved. To achieve this, the following means other than this arrangement can be used:

(1) A multi-stage construction of a pump station.

(2) A pump station arranged in a circular configuration.

(3) A pump station arranged in a vertical direction.

Reference is now made to (1) the multi-stage pump station arranged in a circular configuration.

Figure 21:
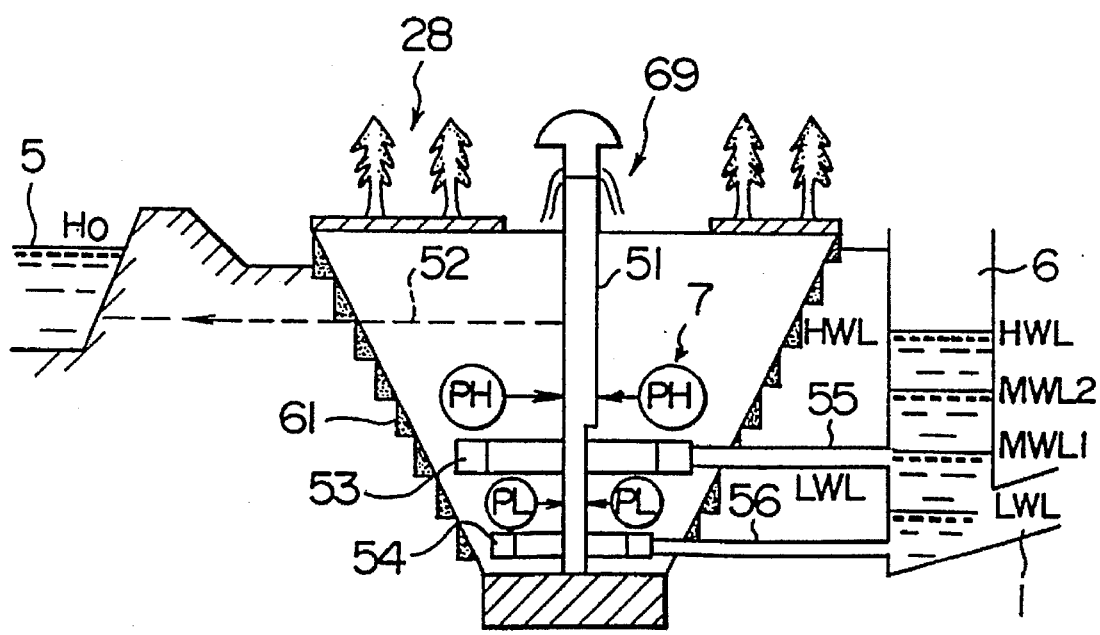
FIG. 21 is a vertical cross-sectional view of a portion of the drainage pump station of FIG. 12.

FIG. 21 is a detailed, vertical cross-sectional view of the pump station 11 as shown in FIG. 12.

Figure 22:
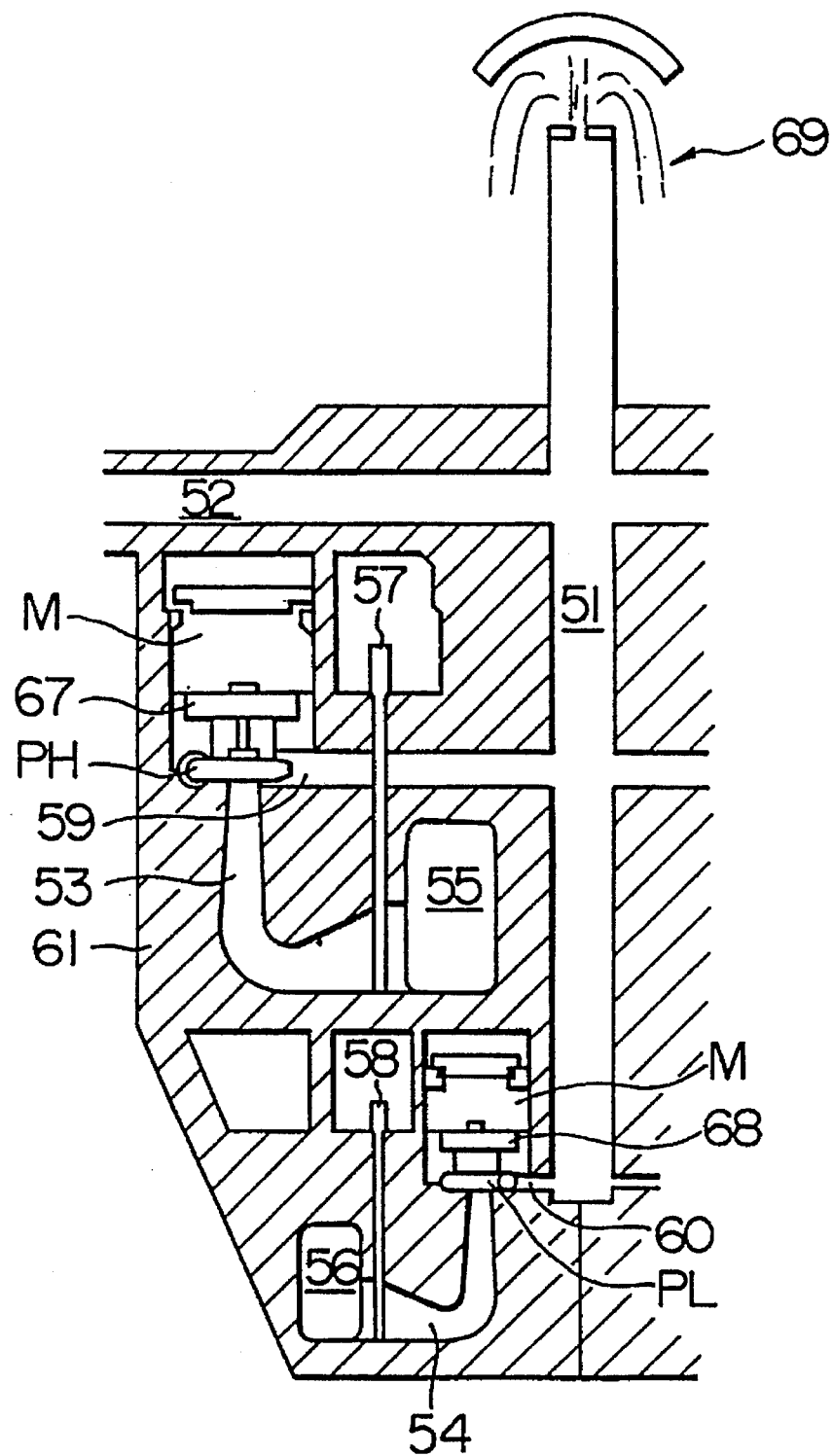
FIG. 22 is a detailed view of a portion of the pump station of FIG. 21.

FIG. 22 is a detailed view of a portion of the construction of FIG. 21.

The inflow water, such as rain water, collected in the underground channel 1 provided in a district to be drained, flows into the pump well 6. The inflow water in the pump well 6 is pumped by a group of drainage pumps 7, and is discharged to the river 5 via a collecting discharge conduit 51 and a discharge channel 52. The group of drainage pumps 7 are arranged in a two-stage manner, that is, mounted at two different levels, and this pump group comprises pumps PL1~n (n is a natural number), and pumps PH1~n. The drainage pump PH is a low-head large-capacity pump, and the drainage pump PL is a high-head small-capacity pump. The drainage pumps PH, as well as the drainage pumps PL, are arranged in a circular configuration (that is, in a circle) in the respective stages. A suction conduit 53 of the drainage pumps PH and a suction conduit 54 of the drainage pumps PL are connected to the pump well 6 via respective collecting suction conduits 55 and 56. Each of the collecting suction conduits 53 and 54 is formed in an annular configuration corresponding to the circular arrangement of the drainage pumps. Suction gate valves 57 and 58 are provided respectively in the suction conduits 53 and 54 of the drainage pumps. The collecting discharge conduit 51 is provided vertically at the center of the group of drainage pumps 7, and discharge conduits 59 and 60 of the drainage pumps PH and PL are connected to the collecting discharge conduit 51. An upper end of the collecting discharge conduit 51 communicates with the river 5 via a discharge channel 52. The diameter of the collecting discharge conduit 51 is reduced at its lower portion at the position where the lower-stage pumps are provided so that it accommodates the drainage of the drainage pumps at the respective stages. An underground pump building 61 in which the group of drainage pumps 7 are mounted has a generally inverted truncated cone-shape. The reason for this is that the installation space for the high-head small-capacity pumps PL in the lower stage is smaller than the installation space for the low-head large-capacity pumps in the upper stage. The underground pump building 61 may have an upper portion of a cylindrical shape and a lower portion of an inverted frusto-conical Shape, as shown in FIG. 22. A maintenance area M used for maintaining the drainage pumps PH and PL and motors 67 and 68 is provided within the underground pump building 61. As shown in FIG. 21, the upper end portion of the collecting discharge conduit 51 may be exposed above the ground surface, and a fountain or a water fall 69 may be provided at this upper end portion, and the ground surface above the underground pump building 61 may be used as a park or the like.

With this construction of this embodiment, the difference between the level of mounting of the upper-stage drainage pumps PH and the water level Ho of the river 5 is small, since these pumps PH are mounted at the higher level. Therefore, the required head is reduced, and the power for the draining operation is saved. Particularly, if the rating of the upper-stage drainage pumps PH is a low head and a large capacity, the power for the draining operation is reduced greatly since the pumping efficiency of the low-head large-capacity pump is high over a wide range.

In the drainage system, when the water level of the pump well 6 is low, the draining rate does not need to be great, and as the water level of the pump well 6 increases, the draining rate is increased. Therefore, as shown in FIG. 21, medium water levels MWL 1 and MWL 2 (for example, Ho–45 m, Ho–30 m) for controlling the number of pumps to be operated may be set intermediate the lower water level LWL (for example, Ho–60 m) and the highest water level HWL (for example, Ho–15 m). In this case, as the water level increases, the pumps are operated sequentially from the lower stage to the higher stage. This effectively saves the power required for the draining operation.

Since the plurality of drainage pumps are arranged in at least two stages, the area or space for building the underground pump building 61 can be reduced. Therefore, the amount of labor including the excavating labor can be reduced, and the construction cost can be reduced. Particularly, since the drainage pumps are arranged in a circle, the outer configuration of the underground pump building 61 can be circular, and this reduces the construction cost greatly.

When the water level in the pump well 6 is low, it is not necessary to drain the water so rapidly, and therefore the lower-stage drainage pumps PL need only have a small capacity, though they have a high head. Therefore, the lower each stage of the underground pump building is, the smaller the area of its stage is, and furthermore if at least the lower portion of the underground pump building is formed in an inverted frusto-conical shape, the amount of excavation, particularly at a deep location of the underground, is reduced. This greatly reduces the construction cost.

Next, reference is now made to (3) the pump station arranged in a vertical direction.

Figure 23:
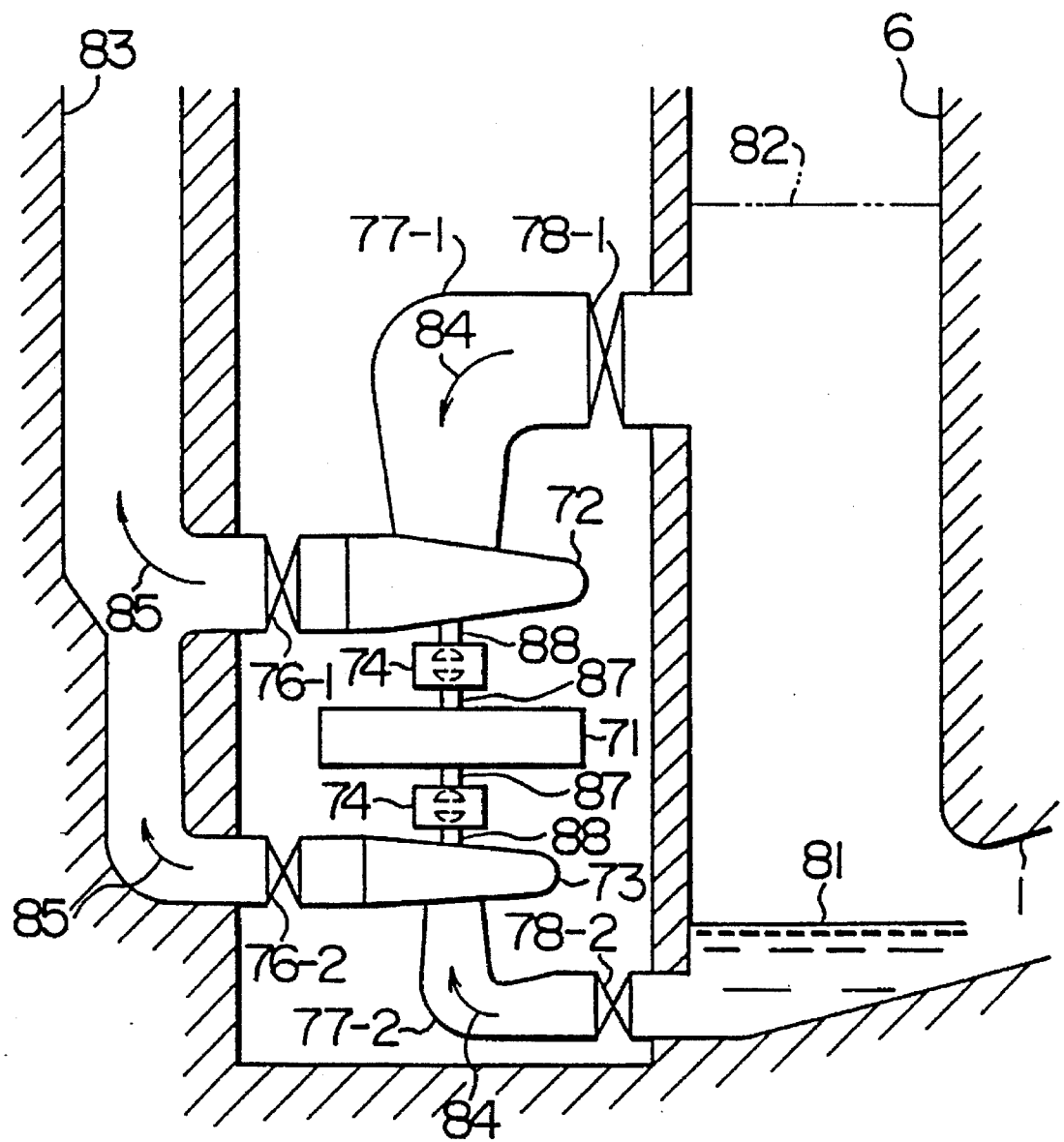
FIGS. 23 and 24 are vertical cross-sectional views showing examples of a pump arrangement in the embodiment of FIG. 12.

FIG. 23 is a vertical cross-sectional showing an example of a pump arrangement in the embodiment of FIG. 12, and showing a pump station in which a vertical-shaft drive multi-stage pump is provided.

In FIG. 23, a drive machine 71 serves as a drive source for pump impellers (not shown), and its main shaft 87 extends in a vertical direction. A large-capacity low-head pump 72 and a small-capacity high-head pump 73 are provided in a vertically spaced relation to each other. Couplings 74 are provided for selectively transmitting rotation torque. The main shaft 87 of the drive machine 71 is connected by the couplings 74 to main shafts 88 of the two pumps 72 and 73. Namely, the drive machine 71 is provided between the two pumps 72 and 73, and although not shown in detail, the drive machine 71 can drive the two pumps.

An underground channel 1 is connected to a pump well 6, and a discharge conduit 83 serves as a discharge channel. A vertical-shaft drive multi-stage pump comprising two or more (two in FIG. 23) pumps, spaced in a vertical direction, is provided between the pump well 6 and the discharge conduit 83. A suction conduit 77-1 of the upper pump 72 is connected via a gate valve 78-1 to the upper portion of the pump well 6, and a suction conduit 77-2 of the lower pump 73 is connected via a gate valve 78-2 to a lower portion of the pump well 6. Discharge sides of the pumps 72 and 73 are connected via respective gate valves 76-1 and 76-2 to the discharge conduit 83.

Water which has flowed from the underground channel 1 into the pump well 6 to be stored there flows into the suction conduits 77 (77-1 and 77-2) when the gate valves 78 (78-1 and 78-2) are in an open condition, and then is discharged by the pumps to the discharge conduit 83. An upper portion of the discharge conduit 83, extending upwardly from that portion thereof to which the discharged water from the large-capacity low-head pump 72 is fed is increased in cross-sectional area. The gate valves 76 (76-1 and 76-2) at the discharge side are closed when the pumps are stopped or deactivated, thereby preventing a reverse flow of the discharged water. Arrows 84 and 85 indicate the directions of flow of the water, and reference characters 81 and 82 denote the water levels.

With this construction of this embodiment, the horizontal space or area of the underground drainage pump station is smaller than that required for the conventional pump station.

The main shaft 87 of the drive machine 71 is connected to the main shafts 88 of the pumps 72 and 73 through the couplings 74 capable of selectively transmitting the rotation torque, and therefore only required ones of the pump impellers can be rotated, and therefore the waste of the energy can be prevented.

The upper one 72 of the two pumps 72 and 73 has a large capacity and a low head, and the lower pump 73 has a small capacity and a high head. Therefore, when the water level of the pump well 6 is low as at 81, the high-head pump 73 can be operated, and when the water level of the pump well 6 is high as at 82, the low-head pump 72 can be operated, and the two pumps can also be operated at the same time.

The drive machine 71 is adapted to drive the two pumps, and therefore the construction is simplified.

Since the discharge conduit 83 is increased in flow area at its downstream portion (upper portion), the operation can be carried out efficiently. Furthermore, the single or common discharge conduit 83 is used for the plurality of pumps, and therefore, advantageously, the construction of the pump arrangement is simplified.

In this embodiment, when the large-capacity low-head pump 72 is not operated, the gate valves 76-1 and 78-1, provided respectively on the opposite sides of the pump 72, can be closed, and then the water can be removed from this pump, so that this pump can be used as a flywheel. This achieves an energy-saving effect and a water hammer prevention effect.

A further embodiment of the invention will now be described with reference to FIG. 24.

Figure 24:
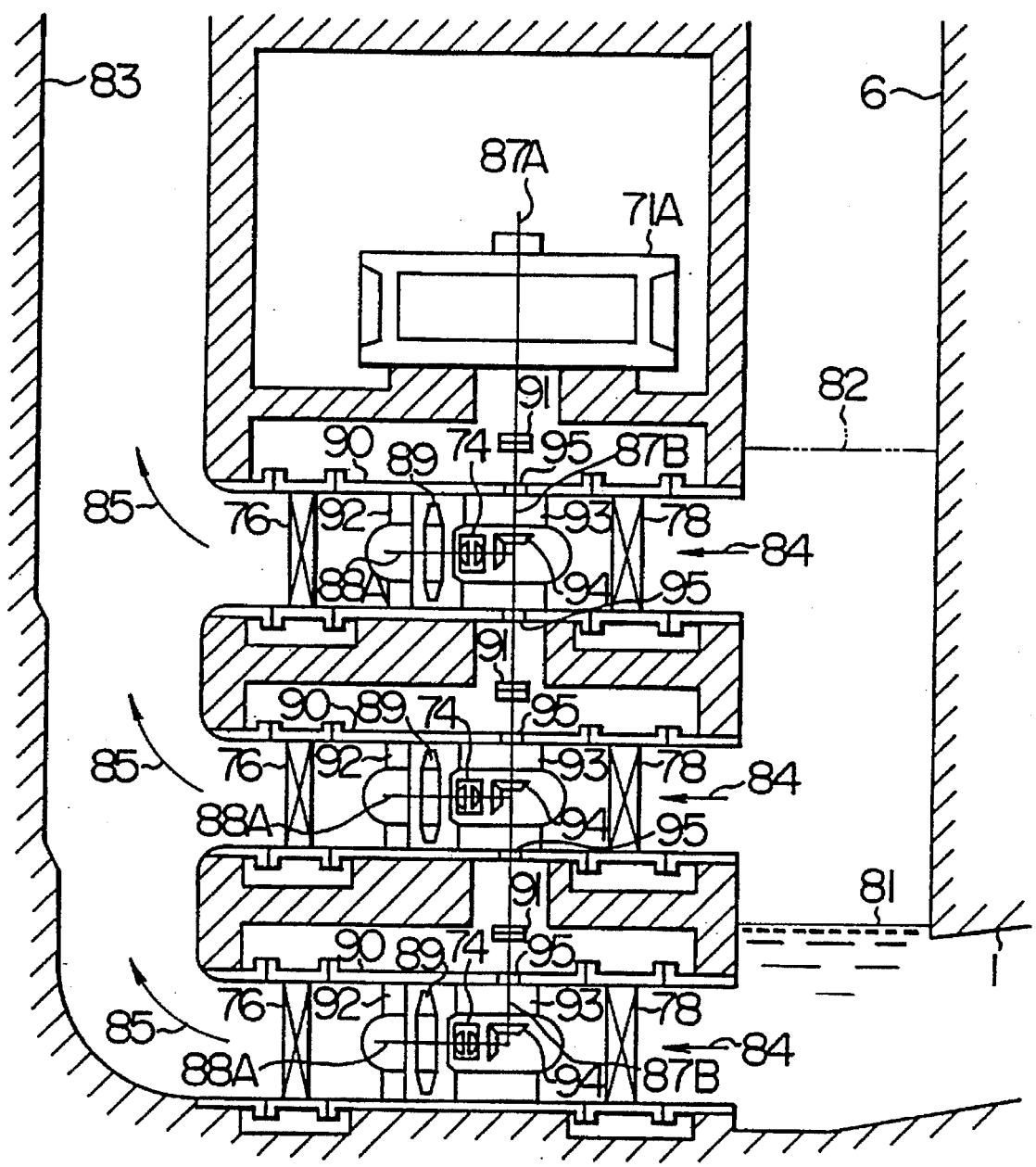

FIG. 24 is a vertical cross-sectional view showing another example of a pump arrangement in the embodiment of FIG. 12, and showing a pump station in which a vertical-shaft drive multi-stage pump is provided.

The same reference numerals of FIG. 24 as those of FIG. 23 denote corresponding parts of the preceding embodiment, and therefore explanation thereof will be omitted.

In the embodiment shown in FIG. 24, impeller rotation shafts of three vertically-spaced pumps 90 extend horizontally, and the three pumps 90 are of the same construction.

In FIG. 24, a drive machine 71A serves as a drive source for the pumps (or pump impellers), and has a main shaft 87A. Two or more (three in FIG. 24) axial pumps 90 are arranged in vertically spaced relation to one another. The axial pumps 90 are connected together in the vertical direction by connection shafts 87B. The main shaft 87A of the drive machine 71 is connected to the connection shafts 87B of the axial pumps 90 by couplings 91. The axial pump 90 comprises an axial impeller 89, and vanes 92 and 93. A rotation shaft 88A of the impeller 89 extends in a horizontal direction. A bevel gear 94 of a perpendicular transmission mechanism transmits the torque of the connection shaft 87B to the rotation shaft 88A of the impeller 89. A casing of the axial pump 90 has holes 95 through which the connection shaft 87B extends.

The rotation shaft 88A of the respective impellers 89 is connected to the bevel gear 94 by a coupling 74 capable of selectively transmitting the rotation torque.

A pump chamber is provided between a pump well 6, connected to an underground channel 1, and a discharge conduit 83, and a vertical-shaft drive multi-stage axial pump comprising two or more (three in FIG. 24) axial pumps 90 is provided in this pump chamber. An upstream side of each axial pump 90 is connected to the pump well 6 via a gate valve 78, and a downstream side thereof is connected to the discharge conduit 83 via a gate valve 76. In this embodiment, an economical construction of the pump station, as well as an efficient operation of the pump, is possible as in the preceding embodiment of FIG. 23, and besides since the rotation shaft 88A of the impeller 89 of each pump is disposed horizontally, and therefore instead of the axial-flow impeller, a mixed-flow impeller can be incorporated as a pump impeller.

In this embodiment, the height of a drainage port or outlet of the discharge conduit 83 is constant, and water in the pump well 6 serves as displacement, and therefore regardless of the height of the water level, heads required respectively for the vertically-spaced axial pumps 90 are the same, and these pumps can be of the same construction. Furthermore, since the pumps are of the same construction, the pump can be provided in the form of a package, and the number of the pumps can be easily increased. This embodiment further has an inherent advantage that the cost of the product can be reduced.

The pump to be mounted in the pump station has a large capacity, and hence is of a large size, and if the pump produces severe vibrations, the pump body and the piping are subjected to a fatigue failure, and the vibrations also produce noises, and therefore adversely affects the work environment. Therefore, the type of pump reduced in pulsation to reduce vibrations will be described below.

Figure 25:
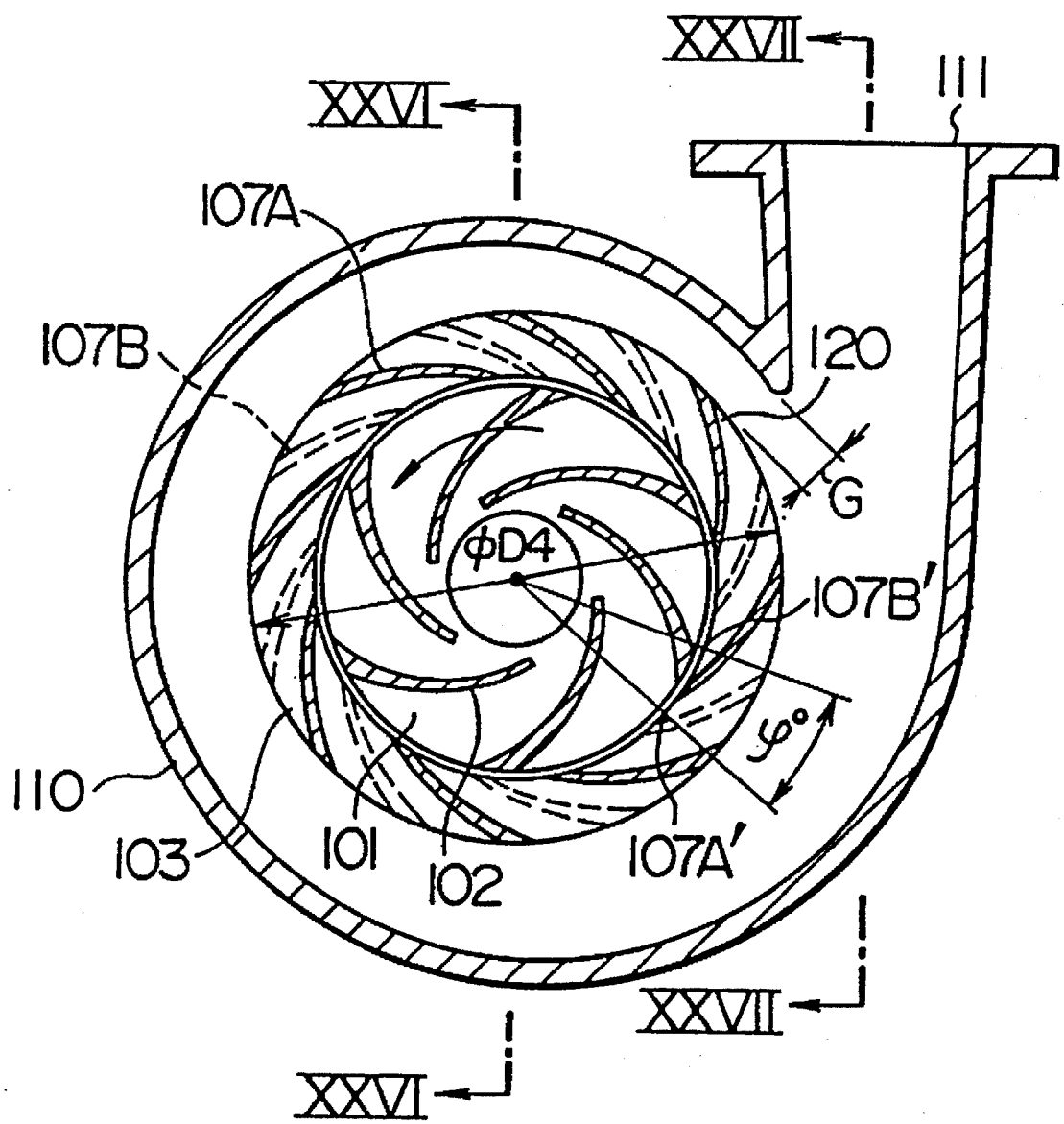
FIG. 25 is a cross-sectional view showing one example of a pump used in the present invention.
Figure 26:
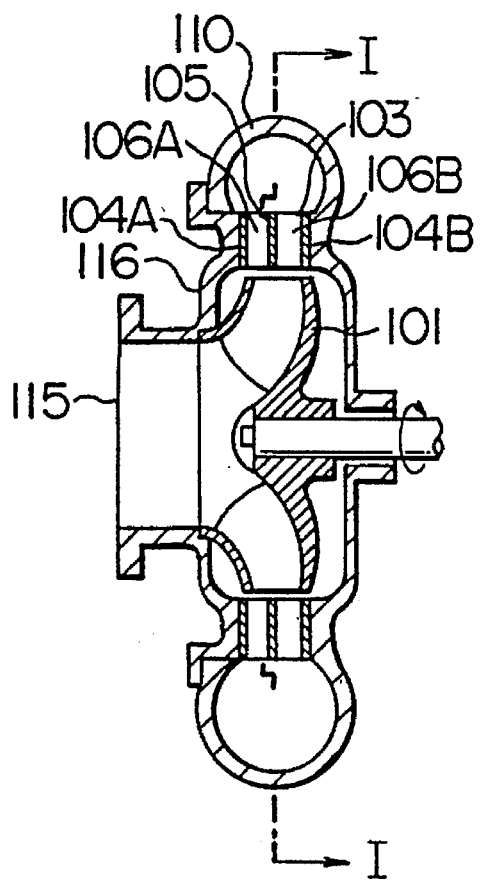
FIG. 26 is a cross-sectional view taken along the line XXVI—XXVI of FIG. 25.
Figure 27:
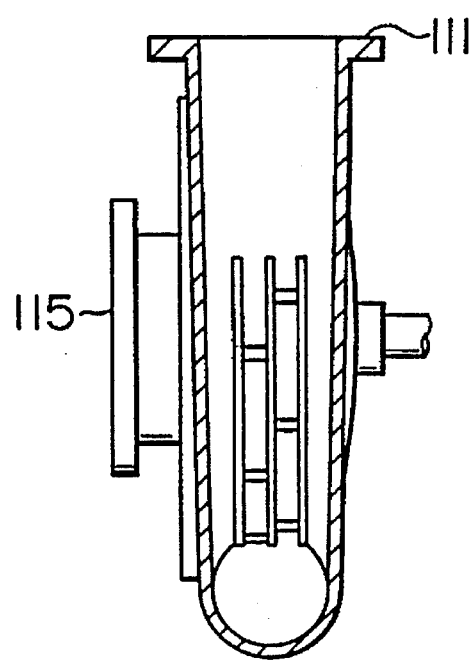
FIG. 27 is a cross-sectional view taken along the line XXVII—XXVII of FIG. 25.

FIGS. 25 to 27 show an embodiment of a single-suction centrifugal diffuser pump of the invention.

FIG. 25 is a cross-sectional view through a plane perpendicular to a pump rotation shaft.

FIG. 26 is a cross-sectional view taken along the line XXVI—XXVI of FIG. 25.

FIG. 27 is a cross-sectional view taken along the line XXVII—XXVII of FIG. 25.

As shown in FIGS. 25 to 27, a diffuser 103 is provided around a single-suction centrifugal impeller 101, and a volute casing 110 is provided outside of the diffuser 103. The volute casing 110 has an integral pump discharge port 111. A suction casing 116 having a pump suction port 115 is connected to the volute casing 110. The volute casing 110 and the suction casing 116 jointly constitute a water flow portion of the diffuser pump.

A partition wall 105 is provided between opposite side walls 104A and 104B of the diffuser 103, and a flow passage within the diffuser 103 is divided by the partition wall 105 into two flow passages 106A and 106B independent of each other in the axial direction. A ring of vanes 107A and a ring of vanes 107B are provided in the two passages 106A and 106B, respectively, and are displaced with respect to each other in the rotational direction. In this embodiment, these two groups of vanes are displaced with respect to each other in such a manner that an inlet end of the diffuser vanes in one of the two passages 106A and 106B is disposed at a central portion of an inlet end of the diffuser vanes in the other passage. In FIG. 25, the inlet end 107B' of the vanes 107B is displaced an angle $\phi°$ with respect to the inlet end 107A' of the vanes 107A in the direction of rotation of the impeller.

The operation of this embodiment will now be described.

The flow enters the diffuser pump through the pump suction port 115, and is increased in velocity by the rotation of the impeller 1, and is discharged to the diffuser 103. In the diffuser 103, the flow is reduced in velocity, and recovers a static pressure. The flow further passes through the volute casing 110, and is discharged from the pump discharge port 111.

As described above, the flow at an outlet portion of the impeller 101 is influenced by the thickness of the vanes and the development of a boundary layer along the vane surface in the impeller 101, so that there is produced an uneven flow velocity distribution one pitch of which corresponds to the intervals between the vanes of the impeller 101. When this uneven flow passes through the inlets of the diffuser vanes 107A and 107B, there is produced a pressure pulsation having a fundamental period corresponding to the time required for rotation for this one pitch. The thus produced pressure pulsation is transmitted to the volute outlet, and a pressure pulsating wave resulting from these pulses is transmitted to a discharge conduit. Part of this pressure pulsating wave is transmitted to a suction conduit via the impeller.

In this embodiment, however, the diffuser passage is divided by the partition wall 105 into the two passages 106A and 106B independent of each other, and the inlet ends 107A' and 107B' of the diffuser vanes in these passages are displaced with respect to each other in the direction of rotation of the impeller. Therefore, the fluid flows from the passage of the impeller into the two diffuser passages 106A and 106B in such a manner that the fluids flowing respectively into the two passages 106A and 106B are shifted from each other by a phase angle $\phi°$ of the rotational angle corresponding to this displacement amount, and then the fluid is discharged from the diffuser passages 106A and 106B. Therefore, pressure pulsations produced respectively at the inlet portions of the diffuser passages 106A and 106B cancel each other at the outlet portions because of this phase shift, so that the pressure pulsations at the outlet portions of the diffuser passages are reduced.

Particularly when the inlet ends 107A' and 107B' of the vanes in the diffuser passages 106A and 106B are displaced with respect to each other by an angle substantially corresponding to a half of the pitch of the impeller vanes, the pressure pulsations alternately produced in the diffuser passages 106A and 106B are out of phase with each other by a half (½) of a wavelength. Therefore, the pressure pulsations in the two passages cancel each other, so that the pressure pulsations are reduced greatly. Namely, here, the following relation is established with respect to the above angle $\phi°$:

$$\phi° = \frac{1}{2} \times 360°/Zi$$

or, $$360°/Zd - \phi° = \frac{1}{2} \times 360°/Zi$$

where $Zi$ represents the number of the vanes of the impeller, and $Zd$ represents the number of the vanes of the diffuser.

In this case, the pulsations alternately produced from the two passages 106A and 106B are out of phase with each other by ½ of the wavelength, and therefore the pressure pulsations propagating respectively through the two passages interfere with each other, so that the pressure pulsations are reduced greatly.

Since the inlet ends 107A' and 107B' of the vanes in the two passages 106A and 106B are displaced with respect to each other, the distance between the inlet end 107A' and the pump discharge port is different from the distance between the inlet end 107B' and the pump discharge port. However, generally, this difference of distance is extremely small as compared with the wavelength of the pressure pulsation, and therefore the influence of this difference of distance on the above phase shift can be disregarded. Therefore, it is only necessary to shift by an angle $\phi°$ to satisfy the above formula. As described above, in this embodiment, the pulsation is intentionally reduced by imparting a unique configuration to the diffuser portion. The partition wall 105 has a disk-shape, and the vanes of the diffuser usually have a two-dimensional configuration. In contrast, in a convention construction in which a passage in an impeller is divided by a partition wall, and vanes on opposite sides of the partition wall are displaced to reduce a pressure pulsation, the partition wall is formed to have a curved surface along a streamline in the case where the impeller is of a single-suction centrifugal type, and besides vanes of the impeller usually have a three-dimensional configuration. Therefore, the pump can be manufactured more easily in this embodiment than in the conventional construction.

In this embodiment, any partition wall is not provided at the inlet portion of the impeller, and therefore a cavitation effect will not be adversely affected.

Furthermore, any partition wall extending along a streamline is not provided in the impeller, and therefore when the pump is operated at a low flow rate, the production of a centrifugal flow and a reverse flow in the impeller is not suppressed, and therefore the degradation of characteristics, such as instability of a pump head curve, will not be encountered.

The above-mentioned large-depth underground drainage facilities capable of carrying out the open channel-closed channel mixed flow operation have the following advantageous effects:

A. The total pump head is markedly reduced, and the installation cost of the pump station, including the costs of the pumps and driving machine, is reduced.

B. The cost of excavating the underground channel is reduced.

C. The risk of overflow to the ground surface is reduced by the storage effect of the very long underground channel D. The above storage effect obviates the need for a large-capacity pumping tank, and therefore the pump station can be built in a midtown area where it is difficult to obtain land.

Although the various embodiments of large-depth underground drainage facilities have been described, the present invention is not limited to these embodiments, and the various techniques in these embodiments can be suitably combined together.

In the present invention, the position of mounting of the pump is disposed at the central portion of the underground channel in the direction of the height, and by carrying out the open channel-closed channel mixed flow operation, the total head of the pump can be reduced, and the pump installation cost can be reduced. And besides, the storage effect of the long underground channel reduces the risk of the increase of the water level, and therefore the diameter of the underground channel can be reduced, thereby reducing the cost of excavating the underground channel.

By using the type of pumps suited for the open channel-closed channel mixed flow operation, the installation costs for the pumps and the drive machine can be reduced.

The large-capacity pumping tank is provided between the pump well and the pump, and by carrying out the closed channel flow operation, the risk of overflow to the ground surface from the underground channel is reduced thanks to the storage effect of this pumping tank, and therefore the diameter of the underground channel can be reduced.

Where it is difficult to obtain a building lot for the pump station, the open channel-closed channel mixed flow operation system not requiring a large-capacity pumping tank is selected, and where it is easy to obtain a building lot for the large-capacity pumping tank, the closed channel flow operation system requiring a small pump head is selected. By doing so, the large-depth underground drainage facility requiring a minimum construction cost can be selected.

Furthermore, it is possible to operate a large-depth underground drainage facility in a stable manner by calculating an amount of rainfall with an outflow factor changed in accordance with an interval between a rainfall pattern and a subsequent rainfall pattern to find an amount of rainfall flowing into vertical shafts, precisely predicting an amount of rainfall flowing into a pump station, and appropriately controlling the operation of the pump station.

What is claimed is:

1. A large-depth underground drainage facility comprising an underground water channel in an underground location at a great depth and into which drain water flows from drainage channels; a vertical water channel; a pumping tank, the bottom of said pumping tank communicating through said vertical water channel with a downstream end of said underground water channel; a vertical discharge channel having an outlet near the ground surface; and a drainage pump for drawing water from said pumping tank and pumping the drawn water through said discharge channel to said outlet, said drainage pump having an impeller disposed to pump water from substantially the level of said bottom of said pumping tank and having a pump suction port communicating with said pumping tank.

2. A drainage pump system comprising a pumping tank, a vertical water channel communicating said pumping tank with a downstream end of an underground water channel provided in an underground location at a great depth, a vertical discharge channel, and a drainage pump for pumping water from said pumping tank through said vertical discharge channel to a discharge location near a ground surface, said drainage pump having a pump impeller disposed to pump water from substantially the level of the bottom portion of said pumping tank, and a pump housing with a pump suction port communicating with said pumping tank.

3. A drainage pump according to claim 2, wherein said bottom portion of said pumping tank is disposed at an underground level higher than the level at which the top of said downstream end of said underground water channel is disposed.

4. A drainage pump according to claim 3, wherein said pumping tank has a large storage capacity.

5. A drainage pump according to claim 3, wherein said pumping tank has a large storage capacity.

6. A large-depth underground drainage facility comprising an underground water channel in an underground location at a great depth and into which drain water flows from drainage channels; a vertical discharge channel having an outlet near the ground surface; a drainage pump station provided at a downstream end of said underground water channel; at least three drainage pumps provided at said drainage pump station for pumping drain water, flowing from said underground water channel, through said discharge channel to said outlet; a water storage tank of large storage capacity communicating with one of said drainage pump station and said underground water channel, said water storage tank being effective to temporarily store drain water which flows into said drainage pump station; and a pump control device for controlling said at least three drainage pumps in accordance with the flow rate of drain water which is to be discharged.

* * * * *